US011164029B2

(12) United States Patent
Manako et al.

(10) Patent No.: US 11,164,029 B2
(45) Date of Patent: Nov. 2, 2021

(54) SURVEY MARKER, IMAGE PROCESSING APPARATUS, IMAGE PROCESSING METHOD, AND PROGRAM

(71) Applicant: SONY CORPORATION, Tokyo (JP)

(72) Inventors: Soshi Manako, Chiba (JP); Sho Murakoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 180 days.

(21) Appl. No.: 16/467,289

(22) PCT Filed: Dec. 14, 2017

(86) PCT No.: PCT/JP2017/044840
§ 371 (c)(1),
(2) Date: Jun. 6, 2019

(87) PCT Pub. No.: WO2018/123607
PCT Pub. Date: Jul. 5, 2018

(65) Prior Publication Data
US 2020/0065605 A1 Feb. 27, 2020

(30) Foreign Application Priority Data
Dec. 27, 2016 (JP) .............................. JP2016-253064

(51) Int. Cl.
G06K 9/46 (2006.01)
G06K 9/62 (2006.01)
(Continued)

(52) U.S. Cl.
CPC .................. G06K 9/46 (2013.01); G06T 7/11 (2017.01); G06T 7/62 (2017.01); G06T 7/90 (2017.01);
(Continued)

(58) Field of Classification Search
CPC ............ G06T 7/90; G06T 2207/10024; G06T 2207/30204–2207/30208;
(Continued)

(56) References Cited

U.S. PATENT DOCUMENTS

2016/0320535 A1 11/2016 Wegmann

FOREIGN PATENT DOCUMENTS

JP H06-294618 A 10/1994
JP H11-083440 A 3/1999
(Continued)

OTHER PUBLICATIONS

Christen et al., "Target Marker: A Visual Marker for Long Distances and Detection in Realtime on Mobile Devices", Proceedings of the World Congress on Electrical Engineering and Computer Systems and Science (EECSS 2015), Barcelona, Spain, Jul. 13-14, 2015, Paper No. 339, 339-1 through 339-7. (Year: 2015).*
(Continued)

Primary Examiner — Brian Werner
(74) Attorney, Agent, or Firm — Paratus Law Group, PLLC

(57) ABSTRACT

There is provided a survey marker, and an image processing apparatus, method, and program capable of accurately detecting a survey marker from a captured image obtained by image capturing. The survey marker has a planar shape and includes a plurality of circles concentrically disposed, the plurality of circles including adjacent circles each having a different color. A candidate region extraction unit extracts a candidate region from a captured image obtained by image capturing of the survey marker, the candidate region being a candidate of a region in which the survey marker appears.
(Continued)

A feature amount extraction unit extracts a feature amount of the candidate region. A discrimination unit discriminates the survey marker on the basis of the feature amount. The present technology can be applied to, for example, a case of detecting a survey marker installed on the ground from a captured image obtained by aerial image capturing.

17 Claims, 35 Drawing Sheets

(51) Int. Cl.
    *G06T 7/62*     (2017.01)
    *G06T 7/11*     (2017.01)
    *G06T 7/90*     (2017.01)
    *G06T 17/05*     (2011.01)

(52) U.S. Cl.
    CPC .... *G06T 17/05* (2013.01); *G06T 2207/10024* (2013.01); *G06T 2207/10032* (2013.01); *G06T 2207/30181* (2013.01)

(58) Field of Classification Search
    CPC ............ G06T 2207/10032–2207/10044; G06T 2207/30181–2207/30192; G06T 2207/10028; G06T 17/00–17/30
    See application file for complete search history.

(56) References Cited

FOREIGN PATENT DOCUMENTS

| | | |
|---|---|---|
| JP | 2005-140547 A | 6/2005 |
| JP | 2005-140550 A | 6/2005 |
| JP | 2014-066538 A | 4/2014 |
| JP | 2014-126424 A | 7/2014 |
| JP | 2016-194515 A | 11/2016 |

OTHER PUBLICATIONS

Machine Translation of JP 2016-194515A, Google Patents, Noriyuki Taira, published on Nov. 17, 2016, p. 1/10-10/10. (Year: 2016).*

Reagan et al., An autonomous unmanned aerial vehicle sensing system for structural health monitoring of bridges, Nondestructive Characterization and Monitoring of Advanced Materials, Aerospace, and Civil Infrastructure 2016, Apr. 22, 2016, pp. 1-9, vol. 9804, Proc. of SPIE, Las Vegas, Nevada.

Cho et al., Multiring Fiducial Systems for Scalable Fiducial-Tracking Augmented Reality, PRESENCE: Virtual and Augmented Reality, Dec. 2001, pp. 599-612, vol. 10, Issue 6.

Verbandt et al., Robust marker-tracking system for vision-based autonomous landing of VTOL UAVs, IMAV 2014: International Micro Air Vehicle Conference and Competition 2014, Aug. 12, 2014, pp. 84-91.

Lange et al., A Vision Based Onboard Approach for Landing and Position Control of an Autonomous Multirotor UAV in GPS-Denied Environments, 2009 International Conference on Advanced Robotics, Jun. 22-26, 2009, pp. 1-6, IEEE, Munich, Germany.

* cited by examiner

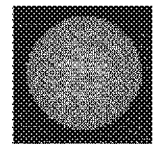 A  360—Gaussian(a=50, μ=0, σ=0.3)
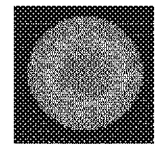 B  360—Gaussian(a=100, μ=0, σ=0.3)
FIG.13

Regarding processing of discriminating in candidate region when survey marker includes three concentric circles

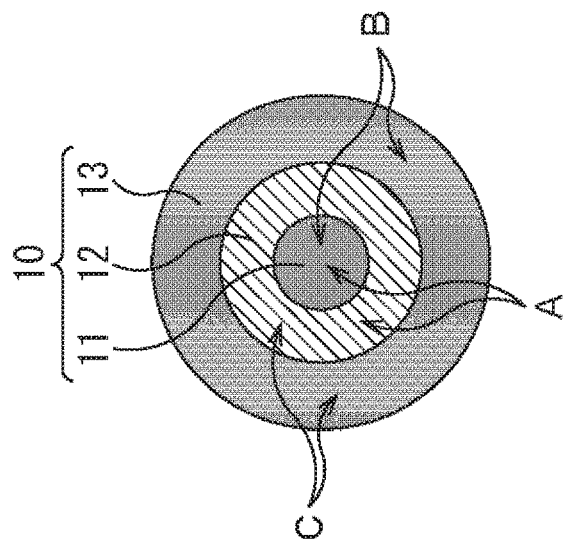

When survey marker includes three concentric circles as shown above, calculate following distances A, B, and C and discriminate survey marker in candidate region by combination thereof.
A: Color distance between circles 11 and 12
B: Color distance between circles 11 and 13
C: Color distance between circles 12 and 13
Here, for color distance, luminance difference is basically used, and when luminance difference of two colors is small, hue difference is used.

FIG.33

SURVEY MARKER, IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2017/044840 (filed on Dec. 14, 2017) under 35 U.S.C. § 371, which claims priority to Japanese Patent Application No. 2016-253064 (filed on Dec. 27, 2016), which are all hereby incorporated by reference in their entirety.

TECHNICAL FIELD

The present technology relates to a survey marker, an image processing apparatus, an image processing method, and a program, and particularly to, a survey marker, an image processing apparatus, an image processing method, and a program that are capable of, for example, accurately detecting a survey marker from a captured image obtained by image capturing of the survey marker.

BACKGROUND ART

For example, the technology of installing and capturing an image of a survey marker, and creating a three-dimensional model on the basis of a control point at which the survey marker appearing in the captured image obtained by the image capturing is installed, thus easily performing measurement of a building or the like within a real space has been proposed (see, e.g., Patent Literature 1).

CITATION LIST

Patent Literature

Patent Literature 1: Japanese Patent Application Laid-open No. 2005-140550

DISCLOSURE OF INVENTION

Technical Problem

When an image of a survey marker is captured and measurement of a building, a soil volume, or the like is performed by using the captured image obtained by image capturing of the survey marker, accurately detecting the survey marker from the captured image is requested.

The present technology has been made in view of the circumstances as described above and enables a survey marker to be accurately detected from a captured image obtained by image capturing of the survey marker.

Solution to Problem

An image processing apparatus or a program of the present technology is an image processing apparatus including: a candidate region extraction unit that extracts a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue; a feature amount extraction unit that extracts a feature amount of the candidate region; and a discrimination unit that discriminates the survey marker on the basis of the feature amount, or a program for causing a computer to function as the image processing apparatus as described above.

An image processing method of the present technology is an image processing method including: extracting a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue; extracting a feature amount of the candidate region; and discriminating the survey marker on the basis of the feature amount.

In the image processing apparatus, the image processing method, and the program of the present technology, a candidate region is extracted from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue. A feature amount of the candidate region is extracted. The survey marker is then discriminated on the basis of the feature amount.

The survey marker of the present technology is a survey marker having a planar shape and including a plurality of circles concentrically disposed and each having a different radius, the plurality of circles including adjacent circles each having a different luminance or hue.

In the survey marker of the present technology, the planar shape is a shape including a plurality of circles concentrically disposed and each having a different radius, and the plurality of circles include adjacent circles each having a different luminance or hue.

Note that the image processing apparatus may be an independent apparatus or an internal block forming a single apparatus.

Further, constituent elements of the image processing apparatus can be distributed and integrated in a plurality of apparatuses.

Furthermore, the program can be provided by transmission via a transmission medium or by recording on a recording medium.

Advantageous Effects of Invention

According to the present technology, it is possible to accurately detect a survey marker from a captured image obtained by image capturing of the survey marker.

Note that the effects disclosed herein are not necessarily limited and may be any effect described in the present disclosure.

BRIEF DESCRIPTION OF DRAWINGS

FIG. 13 is a diagram showing an example of a template image of (circles 11 and 12 of) the survey marker 10.

FIG. 33 is a diagram for describing the general outline of the detection of the survey marker 10 by using the luminance in a case where the survey marker 10 includes the circles 11 to 13.

MODE(S) FOR CARRYING OUT THE INVENTION

<Embodiment of Soil-Volume Measurement System to Which Present Technology is Applied>

Figure 1:
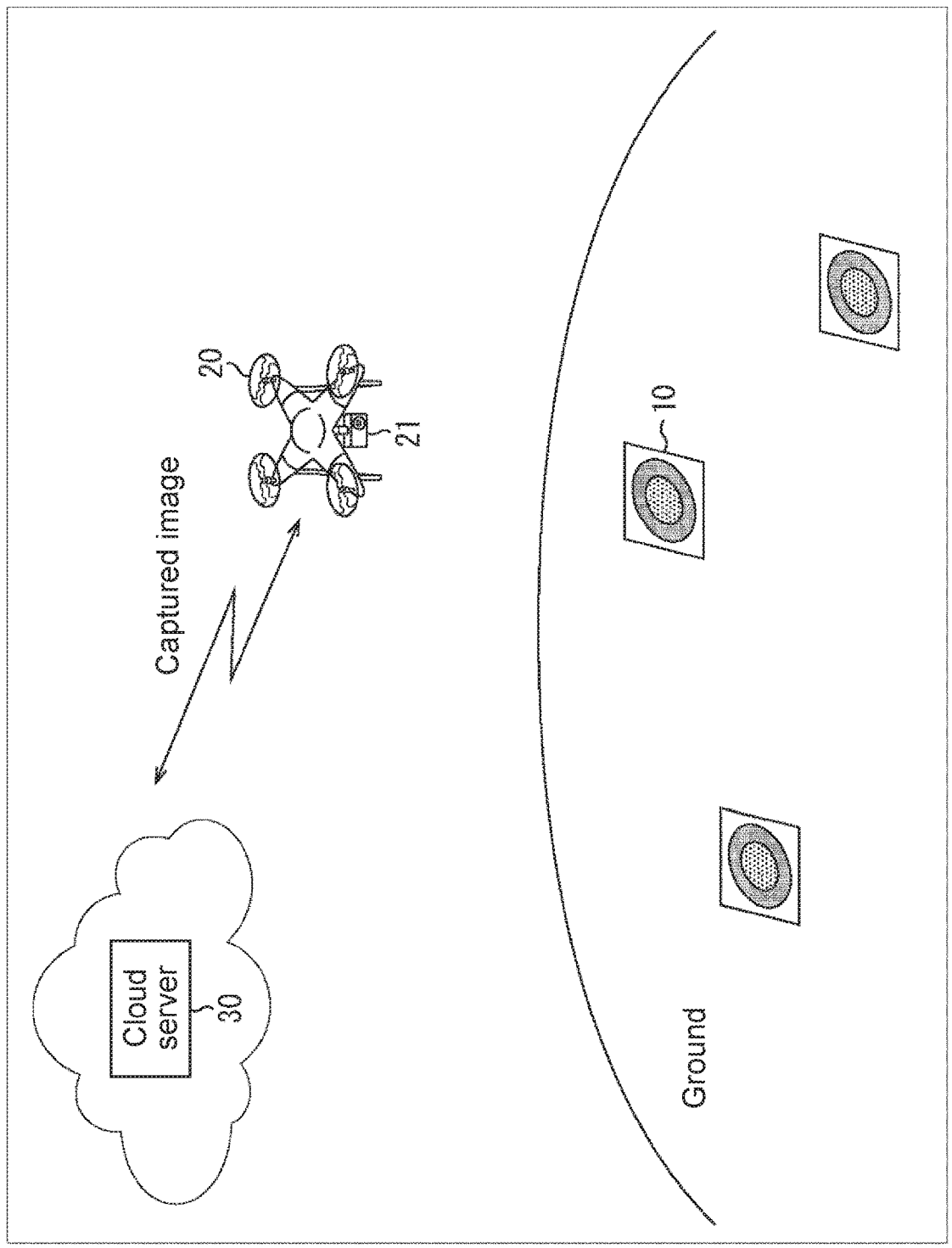
FIG. 1 is a diagram for describing the general outline of an embodiment of a soil-volume measurement system to which the present technology is applied.

FIG. 1 is a diagram for describing the general outline of an embodiment of a soil-volume measurement system to which the present technology is applied.

In the soil-volume measurement system of FIG. 1, soil-volume measurement using a UAV (Unmanned Aerial Vehicle) is performed.

In FIG. 1, survey markers 10 are installed on the ground. The survey markers 10 can be manually installed or can be installed by being distributed from an unmanned aircraft such as a drone or a flight vehicle such as an aircraft operated by a human. Furthermore, the survey marker 10 itself may be moved by installing the survey marker 10 on the back of the drone.

Images of the survey markers 10 are aerially captured. In FIG. 1, a drone 20 equipped with a camera 21 is caused to fly to capture images of the survey markers 10 (aerially capture images of the survey markers 10) with the camera 21 mounted to the drone 20.

Captured images obtained by image capturing of the survey markers 10 with the camera 21 (e.g., still images) are transmitted to, for example, a cloud server 30 by wireless communication or wired communication.

The cloud server 30 performs image processing on the captured images from the camera 21 and thus detects the survey markers 10 appearing in the captured images. Furthermore, the cloud server 30 creates a three-dimensional model of the land form of the ground by using a detection result of the survey markers 10, performs soil-volume measurement of the land form or the like of the ground from the three-dimensional model, and outputs a measurement result of the soil-volume measurement.

Note that the processing performed by the cloud server 30 described above can be performed by the drone 20, not by the cloud server 30. Further, the processing performed by the cloud server 30 described above can be shared between the drone 20 and the cloud server 30.

Furthermore, the method of aerially capturing images of the survey markers 10 is not limited to the method using the drone 20. In other words, the aerial image capturing of the survey markers 10 can be performed by, in addition to the method using an unmanned vehicle such as the drone 20, using a flight vehicle in which a human rides to drive it or an artificial satellite, for example.

Further, for the survey marker 10, paper, plastic, or the like on which a predetermined graphic is printed can be employed. Further, for the survey marker 10, a laminate of plate-like materials of plastic, rubber, or the like having a predetermined shape can be employed. Furthermore, for the survey marker 10, a display panel such as an LCD (Liquid Crystal Display) or an organic EL (Electro Luminescence) display, which displays a predetermined graphic, can be employed. Additionally, for the survey marker 10, a member such as a reflector board, which is spread and unfolded, can also be employed.

Figure 2:
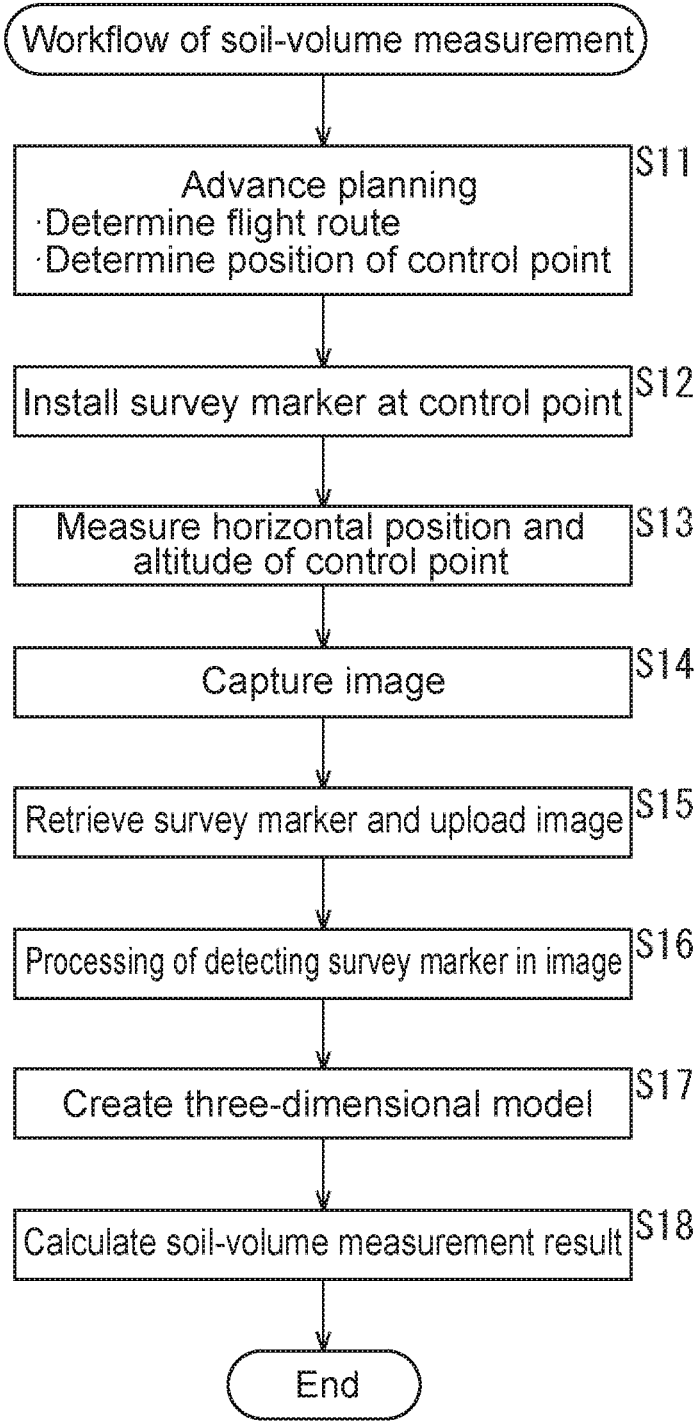
FIG. 2 is a flowchart for describing an example of a workflow of soil-volume measurement performed in the soil-volume measurement system.

FIG. 2 is a flowchart for describing an example of a workflow of the soil-volume measurement performed in the soil-volume measurement system of FIG. 1.

In Step S11, for example, a manager who performs the soil-volume measurement makes advance planning of the soil-volume measurement. In the advance planning, a determination on a flight route of the drone 20, a determination on (a position to be) a control point at which the survey marker 10 is to be installed, or the like is performed.

In Step S12, according to the advance planning, the survey markers 10 are installed at control points that are set with intervals of several hundreds of meters, for example. The installation of the survey markers 10 can be performed manually or with a movable robot, for example. Furthermore, the survey marker 10 itself may be a movable robot.

In Step S13, a horizontal position (latitude and longitude) and an altitude of the control point at which each survey marker 10 is installed are measured.

In Step S14, according to the advance planning, the drone 20 is caused to fly to aerially capture images of the survey markers 10, that is, to capture an image of the ground on which the survey markers 10 are installed (predetermined land surface range as soil-volume measurement target), with the camera 21 mounted to the drone 20.

In the aerial image capturing of the survey markers 10, one or more captured images are captured as captured image data. Furthermore, the aerial image capturing of the survey markers 10 is performed such that, when image capturing ranges that appear in all of the captured images are gathered, the whole range where the survey markers 10 are installed appears in the gathering of the image capturing ranges.

Further, the aerial image capturing of the survey markers 10 is performed such that an image capturing range appearing in a certain captured image and an image capturing range appearing in another captured image partially overlap with each other.

In Step S15, the survey markers 10 installed on the ground are retrieved, and the captured image data obtained by image capturing of the survey markers 10 with the camera 21 is uploaded (transmitted) to the cloud server 30.

In Step S16, the cloud server 30 performs detection processing of detecting, from the captured images captured with the camera 21, (the images of) the survey markers 10 appearing in the captured images.

In Step S17, the cloud server 30 performs processing of generating three-dimensional model data of the ground by using the horizontal position and the altitude of the control point, which are measured in Step S13, and the detection result data of the survey markers 10, which is obtained in the detection processing performed in Step S16.

In Step S18, the cloud server 30 performs soil-volume measurement processing by using the three-dimensional model data of the ground and performs processing of outputting measurement result data of the soil-volume measurement.

<Survey Marker 10>

Figure 3:
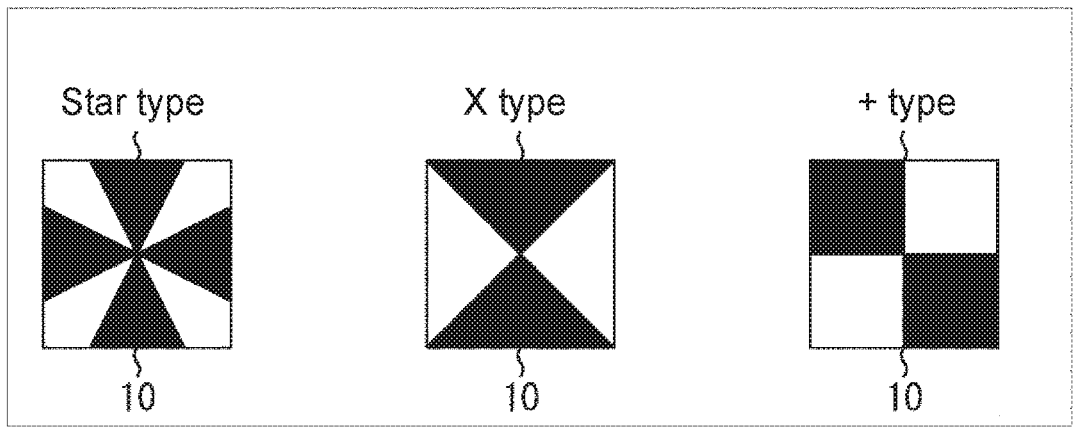
FIG. 3 is a plan view showing a first example of a survey marker 10.

FIG. 3 is a plan view showing a first example of the survey markers 10.

The survey markers 10 of FIG. 3 are survey markers called a star type, an X type, and a plus (+) type.

In the survey markers 10 of the star type, the X type, and the plus type, a white color and a black color that do not have hues are given to two regions adjacent to each other.

Here, in the aerial image capturing of the survey markers 10 installed on the ground, if the image capturing of the survey markers 10 is performed from a position as high as possible, an image of a wider range can be captured, and the number of captured images can be reduced.

When the number of captured images is reduced, it is possible to reduce an overlapping range of an image capturing range appearing in a certain captured image and an image capturing range appearing in another captured image, a time during which the captured image is uploaded to the cloud server 30, the load caused when the cloud server 30 processes the captured images, and the like.

However, (the images of) the survey markers 10 appearing in the captured images become small when the images of the survey markers 10 are captured from a height.

Furthermore, in a case where the survey marker 10 is a marker having a white color and a black color, such as the survey marker of the star type, the X type, or the plus type, there is a possibility that the expansion of the white color, the contraction of the black color, and the like are caused in the captured image, and similar patterns are caused by black of the soil of the ground and white of snow due to snow coverage. Accordingly, the detection accuracy for detecting the survey marker 10 from the captured image may be lowered.

Further, in the survey marker 10 of the star type, the X type, or the plus type, an intersection point of (the extended lines of) the boundary lines between (the regions provided with) the white color and the black color is detected as the center of the survey marker 10. Therefore, when the expansion of the white color and the contraction of the black color occur, the detection accuracy for detecting the center of the survey marker 10 may be lowered.

Figure 4:
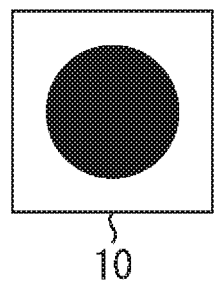
FIG. 4 is a plan view showing a second example of the survey marker 10.

FIG. 4 is a plan view showing a second example of the survey marker 10.

In the survey marker 10 of FIG. 4, a circle of a black color is disposed within a rectangle of a white color.

Since the survey marker 10 of FIG. 4 has a simple configuration as compared to the survey markers 10 of FIG. 3, an object that appears like a black circle in the captured image may be erroneously detected as a survey marker 10.

Here, since the survey marker 10 of FIG. 4 has a single circle, it can be called a single-circle-type marker.

Figure 5:
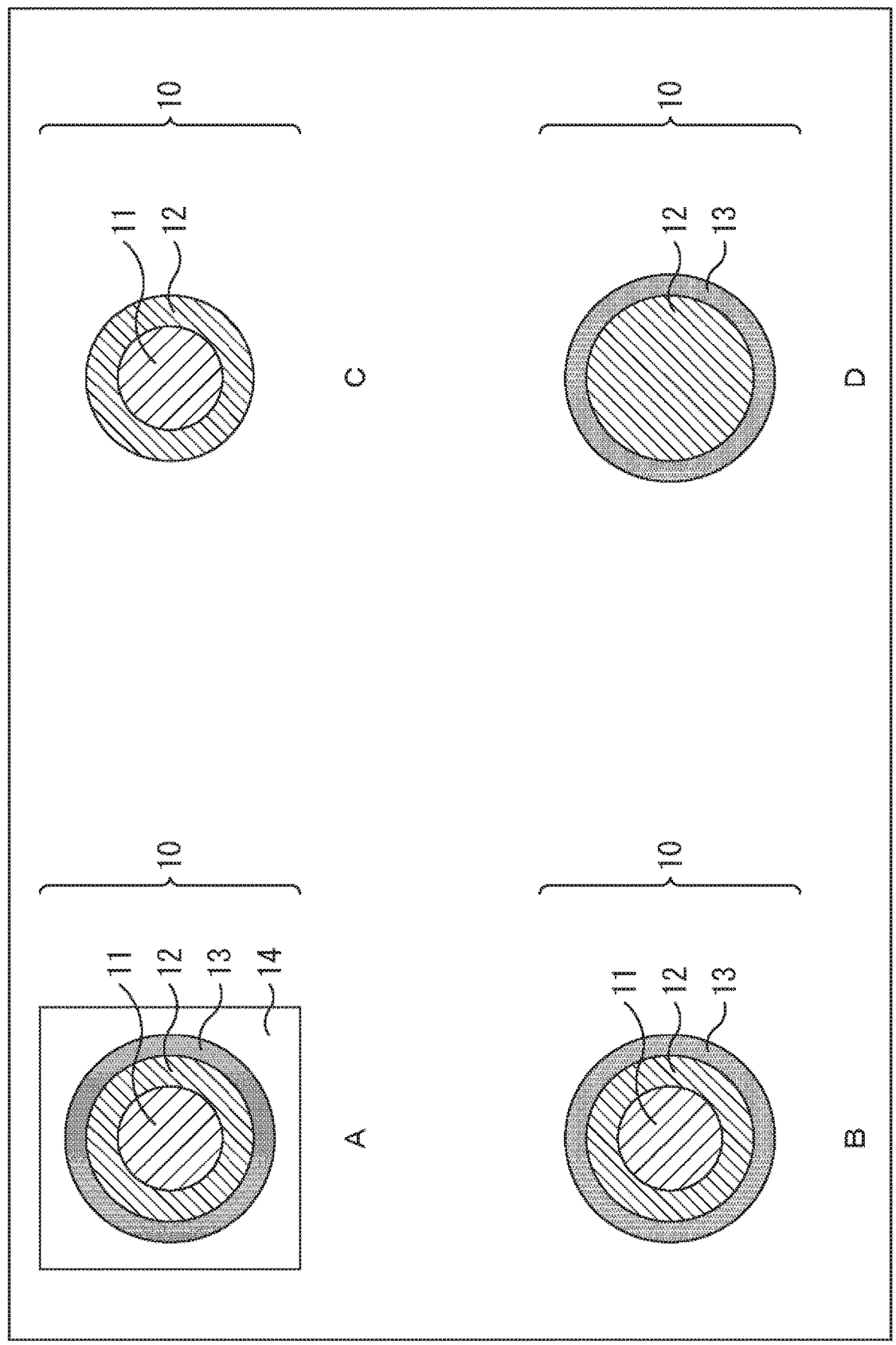
FIG. 5 is a plan view showing a third example of the survey markers 10.

FIG. 5 is a plan view showing a third example of the survey markers 10.

The survey markers 10 of FIG. 5 are markers, each of which has a planar shape and includes a plurality of circles concentrically disposed and each having a different radius, and the circles adjacent to each other among the plurality of circles each have a different hue.

Here, the planar shape means the shape of an object, which is depicted in a plan view when the object is expressed in the plan view.

The survey markers 10 of FIG. 5 each have a plurality of circles, and can thus be called multi-circle-type markers.

According to the survey markers 10 of the multi-circle-type markers (the same holds true for the single-circle-type marker of FIG. 4), it is possible to detect the survey marker 10 without considering the orientation (rotation) of the survey marker 10 appearing in the captured image, and to mitigate the load of the cloud server 30 for the detection processing of detecting the survey marker 10. Furthermore, it is possible to easily detect the center of the survey marker 10.

A of FIG. 5 is a plan view showing an example of a first multi-circle-type marker as the survey marker 10.

The survey marker 10 in A of FIG. 5 has a planar shape in which three circles 11, 12, and 13 each having a different radius are concentrically disposed, and a rectangular frame region 14 having a shape such as a square or a rectangle and including the three circles 11 to 13 is disposed.

In FIG. 5, the radius increases in the order of the circles 11 to 13.

Furthermore, in FIG. 5, among the circles 11 to 13, adjacent circles have different hues.

In other words, in FIG. 5, the color of the circle 11 having the smallest radius is, for example, a blue color that is one of chromatic colors (having hues), and the color of the circle 12 having the second smallest radius is, for example, a red color that is another one of the chromatic colors. Furthermore, the color of the circle 13 having the third smallest (the largest) radius is, for example, a black color that is one of achromatic colors.

Note that in the multi-circle-type marker as the survey marker 10, the adjacent circles only need to have different hues. Therefore, if the adjacent circles 11 and 12 have different hues and the adjacent circles 12 and 13 have different hues, the circles 11 and 13 that are not adjacent to each other may have the same hue.

In other words, for example, the black color of the achromatic color, the red color of the chromatic color, and the black color of the achromatic color can be employed as the colors of the circles 11 to 13, respectively.

The frame region 14 can be made of, for example, rectangular paper or plastic or the like.

In a case where the frame region 14 is made of rectangular paper or plastic or the like, the survey marker 10 can be constituted by, for example, printing the circles 11 to 13 in the frame region 14 made of paper, plastic, or the like.

Further, the circles 11 to 13 and the frame region 14 can be made of, for example, plate-like materials such as plastic, rubber, or the like. In this case, the survey marker 10 can be constituted by superimposing the plate-like materials, which are the circles 11 to 13 and the frame region 14, in the order of the frame region 14 and the circles 13, 12, and 11 from the bottom to the top.

In addition, the survey marker 10 can include, for example, a display panel such as an LCD or an organic EL display. When the display panel is caused to display the circles 11 to 13 and the frame region 14, the display panel can be caused to function as the survey marker 10.

Note that the date of the installation of the survey marker 10 and other comments can be described in a region, of the frame region 14, in which the circles 11 to 13 are excluded.

B of FIG. 5 is a plan view showing an example of a second multi-circle-type marker as the survey marker 10.

The survey marker 10 in B of FIG. 5 has a configuration in which the frame region 14 is not provided as compared to the multi-circle-type marker in A of FIG. 5. Therefore, survey marker 10 in B of FIG. 5 has a configuration in which the three circles 11, 12, and 13 each having a different radius are concentrically disposed.

C of FIG. 5 is a plan view showing an example of a third multi-circle-type marker as the survey marker 10.

The survey marker 10 in C of FIG. 5 has a configuration in which the circle 13 and the frame region 14 are not provided as compared to the multi-circle-type marker in A of FIG. 5. Therefore, the survey marker 10 in C of FIG. 5 has a configuration in which the two circles 11 and 12 each having a different radius are concentrically disposed.

D of FIG. 5 is a plan view showing an example of a fourth multi-circle-type marker as the survey marker 10.

The survey marker 10 in D of FIG. 5 has a configuration in which the circle 11 and the frame region 14 are not provided as compared to the multi-circle-type marker in A of FIG. 5. Therefore, the survey marker 10 in D of FIG. 5 has a configuration in which the two circles 12 and 13 each having a different radius are concentrically disposed.

Note that, as the survey marker 10, other configurations such as a configuration in which the frame region 14 is provided to the multi-circle-type marker in C or D of FIG. 5 and a configuration in which four or more circles each having a different radius are concentrically disposed can be employed.

Figure 6:
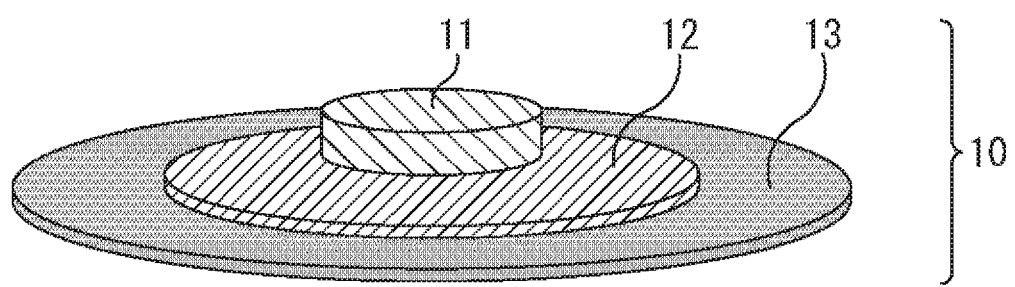
FIG. 6 is a perspective view showing an example of a second multi-circle-type marker as the survey marker 10.

FIG. 6 is a perspective view showing an example of the second multi-circle-type marker as the survey marker 10 in B of FIG. 5.

Here, the second multi-circle-type marker has a planar shape including the there circles 11 to 13 and are thus also called a three-circle-type marker.

The three-circle-type marker as the survey marker 10 in FIG. 6 includes a short columnar member to be the circle 11 (hereinafter, also referred to as columnar member 11), a plate-like circular member to be the circle 12 (hereinafter, also referred to as circular member 12), and a plate-like circular member to be the circle 13 (hereinafter, also referred to as circular member 13).

In other words, the survey marker 10 of FIG. 6 is constituted by superimposing the columnar member 11 and the circular members 12 and 13 in the order of the circular members 13 and 12 and the columnar member 11 from the bottom to the top.

The columnar member 11 can be made of, for example, plastic (ABS resin). Furthermore, the columnar member 11 can be configured to be hollow and can integrate an illuminance detection apparatus including an illuminance sensor that detects the illuminance of (on) the survey marker 10, a communication apparatus including an antenna and a circuit that perform wireless communication, a recording apparatus including a recording medium such as a semiconductor on which information detected by the illuminance detection apparatus is recorded in chronological order, and the like (which are not shown). Note that the survey marker 10 may integrate those illuminance detection apparatus and others in a part of the survey marker, the part excluding the columnar member 11. Further, the survey marker 10 may integrate another sensor other than the illuminance sensor in the columnar member 11 or another member and may transmit, by the communication apparatus, data regarding the survey marker detected by the sensor or may record the data by the recording apparatus.

For example, in a case where the columnar member 11 is caused to integrate the illuminance detection apparatus and the communication apparatus, in the survey marker 10, information of the illuminance detected by the illuminance detection apparatus can be transmitted by the communication apparatus.

The information of the illuminance or the like transmitted from the survey marker 10 can be received in the cloud server 30 to be put to use in the processing in the cloud server 30.

Note that in a case where the illuminance detection apparatus, the communication apparatus, or the like is not integrated in the columnar member 11, the columnar member 11 can be constituted to be plate-like and circular as in the circular member 12 or 13. Further, an apparatus to be integrated in the columnar member 11 can be taken out (detached) from the columnar member 11 for the purpose of charging or the like.

The circular member 12 can be made of, for example, a member such as rubber, which is difficult to discolor by ultraviolet rays. When the circular member 12 is made of a member difficult to discolor by ultraviolet rays, and when the hue of the color provided to the circular member 12 is used to detect the survey marker 10, lowering of the detection accuracy of the survey marker 10 due to the discoloring of the circular member 12 can be suppressed.

The circular member 13 can be made of, for example, an insulator of polypropylene or the like. When the circular member 13 is made of the insulator, the circular member 12, the columnar member 11, and further the communication apparatus or the like integrated in the columnar member 11 can be prevented from being electrically connected to the ground (earth).

Here, as will be described later, in order (to extract a candidate region to be a candidate of the survey marker 10 from the captured image) to recognize the survey marker 10, at least a hue of the color of the circular member 12 is used.

In a case where the survey marker 10 is constituted without including the circular member 13, when the survey marker 10 is installed on the ground, the circular member 12 comes into contact with the ground. Various colors may exist as a color of the installation site of the survey marker 10. Thus, depending on the color of the installation site of the survey marker 10, a large degree of color mixture occurs between the color of the circular member 12 and the color of the installation site of the survey marker 10 in the captured image, and discrimination of the survey marker 10 is affected according to the degree of the color mixture.

In this regard, when the survey marker 10 is provided with the circular member 13, the color mixture between the color of the circular member 12 and the color of the installation site of the survey marker 10 can be prevented from occurring.

Note that, in this case, the color mixture between the colors of the circular members 12 and 13 affects the discrimination of the survey marker 10.

However, in a case where the survey marker 10 is constituted without the circular member 13, the degree of the color mixture between the color of the circular member 12 and the color of the installation site of the survey marker 10 varies depending on the color of the installation site of the survey marker 10. Therefore, the degree at which the color mixture between the color of the circular member 12 and the color of the installation site of the survey marker 10 affects the discrimination of the survey marker 10 varies depending on the color of the installation site of the survey marker 10.

In contrast to this, in a case where the survey marker 10 is provided with the circular member 13, the degree of the color mixture between the colors of the respective circular members 12 and 13 does not vary depending on the color of the installation site of the survey marker 10. Therefore, the degree at which the color mixture between the colors of the respective circular members 12 and 13 affects the discrimination of the survey marker 10 does not vary depending on the color of the installation site of the survey marker 10.

As described above, with the circular member 13, it is possible to prevent the degree of the color mixture with the color of the circular member 12 from varying depending on the color of the installation site of the survey marker 10.

Here, for the size of the multi-circle-type marker as the survey marker 10, for example, a size having a diameter of approximately 30 cm, such as a 10 to 30-cm square, can be employed such that a human can carry a certain number of survey markers 10 in consideration of carrying of the survey markers 10 when the human installs the survey markers 10.

Figure 7:
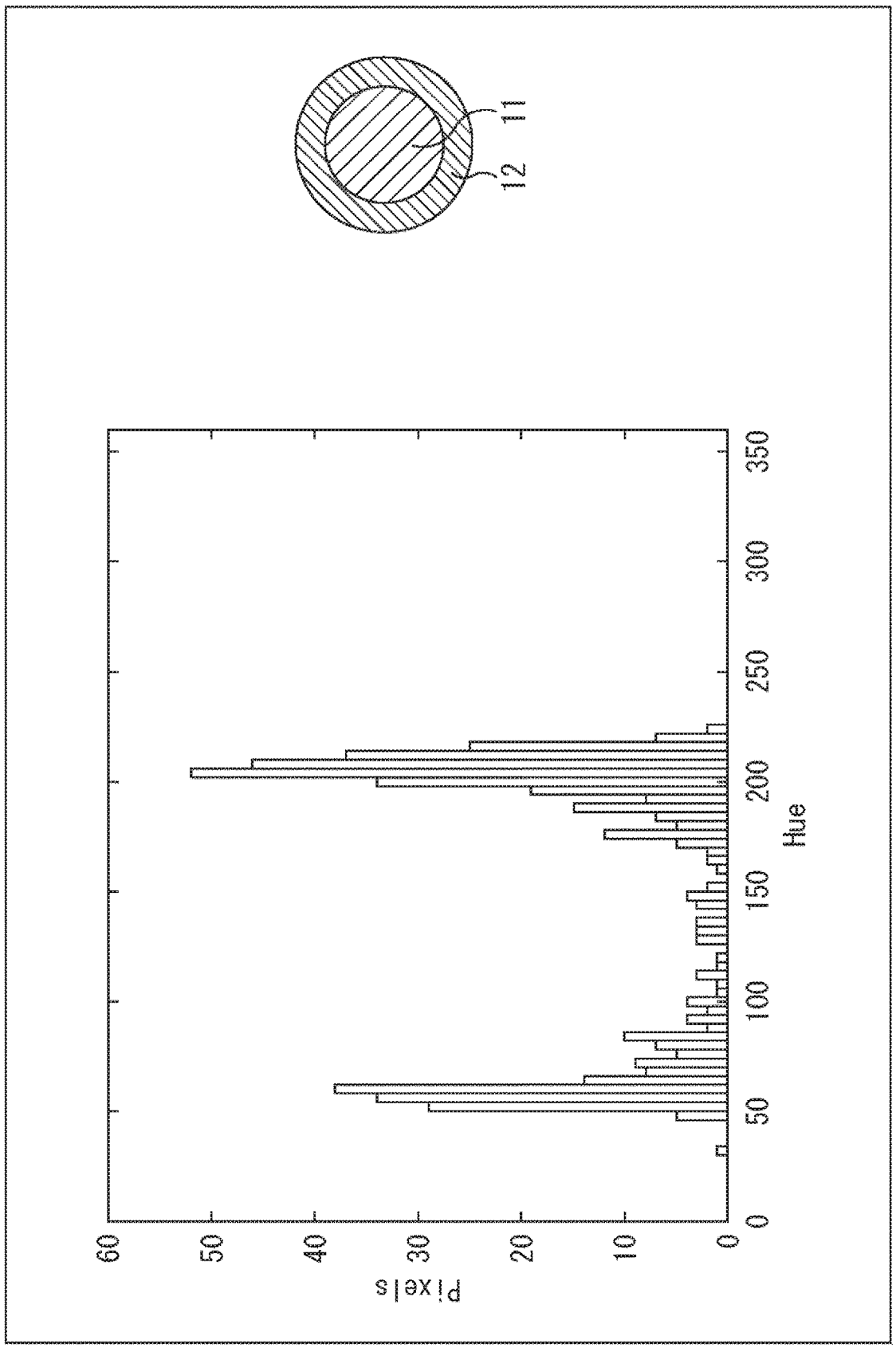
FIG. 7 is a diagram for describing the color of the survey marker 10.

FIG. 7 is a diagram for describing the color of the survey marker 10.

Here, as described in FIGS. 1 and 2, the cloud server 30 detects, from a captured image obtained by aerial image capturing, the survey marker 10 appearing in the captured image.

The cloud server 30 detects the survey marker 10 by using, for example, the hue of the circle (circular member) 12. In other words, the cloud server 30 detects the survey marker 10 by using, for example, the hue itself of the circle 12, a distance between the hue of the circle 12 and the hue of the circle 11 adjacent to the circle 12, or the like.

When attention is focused on the use of the hue itself of the circle 12 or a distance between the hues of the respective circles 11 and 12 adjacent to each other in order to detect the survey marker 10, it is effective that the colors of the respective circles 11 and 12 are colors difficult to cause the color mixture (colors causing low degree of color mixture) when image capturing is performed from a certain height, i.e., for example, a height at which the aerial image capturing is scheduled.

According to the experiment performed by the inventors of the subject application, the suppression of the color mixture is confirmed, for example, in a case where a combination of the black color for the color of the circle 11 and a color having a hue different from the black color, which is for the color of the circle 12, is employed as the color combination of the circle 11 and the circle 12.

For example, in a case where a combination of the black color for the color of the circle 11 and a red color for the color of the circle 12 is employed as the color combination of the circle 11 and the circle 12, it is confirmed that the color mixture remains to an extent that the black color of the circle 11 and the red color of the circle 12 are visible in a captured image obtained by aerial image capturing from the height of 65 m.

Note that when the circle 11 is too large as compared to the circle 12, the saturation of the circle 12 appearing in the captured image is reduced, which makes it difficult to discriminate the circle 12. Meanwhile, when the circle 11 is too small as compared to the circle 12, the lightness of the circle 12 appearing in the captured image is reduced, which makes it difficult to discriminate the circle 12.

In this regard, it is effective that the circles 11 and 12 are set to have the sizes at which the ease of discrimination of the circle 12 is increased.

According to the experiment performed by the inventors of the subject application, it is confirmed that when an area of a portion of the circle 12, the portion excluding the circle 11, is set to approximately substantially 1.0 to 3.0 times the area of the circle 11, the ease of discrimination of the circle 12 is increased.

When attention is focused on the use of the distance between the hues of the respective circles 11 and 12 adjacent to each other in order to detect the survey marker 10, it is effective that the combination of the colors of the respective circles 11 and 12 is a combination whose possibility of existing in nature is as low as possible.

Furthermore, it is effective that the combination of the colors of the respective circles 11 and 12 is a combination in which the hues of the respective colors are as different as possible.

Further, it is effective that the combination of the colors of the respective circles 11 and 12 is a combination in which the degree of the color mixture is as low as possible when image capturing is performed from a certain height, i.e., for example, a combination in which a distance between the hue of the circle 11 and the hue of the circle 12, which are obtained from the captured image, is as large as possible.

FIG. 7 shows an example of a histogram of the hues of pixels of the respective circles 11 and 12, which are obtained from the captured image obtained by image capturing of the survey marker 10.

Here, unless otherwise stated, the circle 12 means an annular portion that excludes the circle 11 in the entire circle as the circle 12.

In the histogram of FIG. 7, the pixels of (the region estimated as) the circle 11 and (the pixels estimated as) the circle 12 are detected from the captured image, and for the pixels of those circles 11 and 12, the frequency of the pixels (the number of pixels) having the respective hues is shown.

Note that in FIG. 7 the horizontal axis represents the hue and the vertical axis represents the frequency.

In the hue histogram for the pixels of the circles 11 and 12 detected from the captured image (hereinafter, also referred to as hue histogram), for example, as shown in FIG. 7, two distributions, a distribution with a peak of a first hue and a distribution with a peak of a second hue are present.

For the distance between the hues of the respective circles 11 and 12, for example, a distance between the peaks of the two respective distributions (difference in hue between peaks) existing in the hue histogram can be employed.

Further, for the distance between the hues of the respective circles 11 and 12, for example, a difference in integrated value such as a mean value of the hues of the respective pixels between the respective circles 11 and 12 detected from the captured image can be employed.

Now, for example, assuming that a difference in mean value of the hues of the respective pixels between the circles 11 and 12 detected from the captured image is employed as a distance DF between the hues of the respective circles 11 and 12, the distance DF between the hues of the respective circles 11 and 12 is expressed by Expression (1).

[Math. 1]

$$DF = \left| \frac{\sum_{(i,j) \in Area1} H_{i,j}}{N1} - \frac{\sum_{(i,j) \in Area2} H_{i,j}}{N2} \right| \quad (1)$$

In Expression (1), $H_{i,j}$ represents the hue of the pixel at a position (i, j) of the captured image. N1 and N2 represent the number of pixels of the circles 11 and 12 detected from the captured image, respectively. The summation (Σ) of the first term on the right side represents the summation for the pixel of the circle 11 detected from the captured image ((i, j)∈pixels of Area1), and the summation (Σ) of the second term on the right side represents the summation for the pixel of the circle 12 detected from the captured image ((i, j)∈pixels of Area2).

Note that in a case where the pixel value of the pixel of the captured image is expressed by an R (Red) value, a G (Green) value, and a B (Blue) value of an RGB color space, the R value, the G value, and the B value can be converted into a hue H (Hue), a saturation S (Saturation), and a luminance L (Lightness) of an HLS space according to Expression (2).

[Math. 2]

$$M = \max(R, G, B) \quad (2)$$
$$m = \min(R, G, B)$$
$$H = \begin{cases} 60 \times \frac{G-R}{M-m} + 60 & (m = B) \\ 60 \times \frac{B-G}{M-m} + 180 & (m = R) \\ 60 \times \frac{R-B}{M-m} + 300 & (m = G) \end{cases}$$
$$L = \frac{M+m}{2}$$
$$S = M - m$$

In Expression (2), max(A, B, C) represents the maximum value among A, B, and C, and min(A, B, C) represents the minimum value among A, B, and C. As shown in Expression (2), regarding the hue H, a conversion equation from RGB differs depending on whether the minimum value m is the R value, the G value, or the B value.

The distance DF between the hues of the respective circles 11 and 12 expresses the degree of the color mixture between the colors of the respective circles 11 and 12. As the distance DF becomes larger, the degree of the color mixture becomes smaller.

In this regard, two predetermined colors, with which the distance DF between the hues has a predetermined threshold TH or more, are assumed as colors difficult to cause the color mixture (colors causing low degree of color mixture) and can be employed as the colors of the respective circles 11 and 12.

Hereinafter, for ease of explanation, the two colors, with which the distance DF between the hues has a predetermined threshold TH or more, are also referred to as colors not causing the color mixture, and the two colors, with which the distance DF between the hues does not have a predetermined threshold TH or more, are also referred to as colors causing the color mixture.

Figure 8:
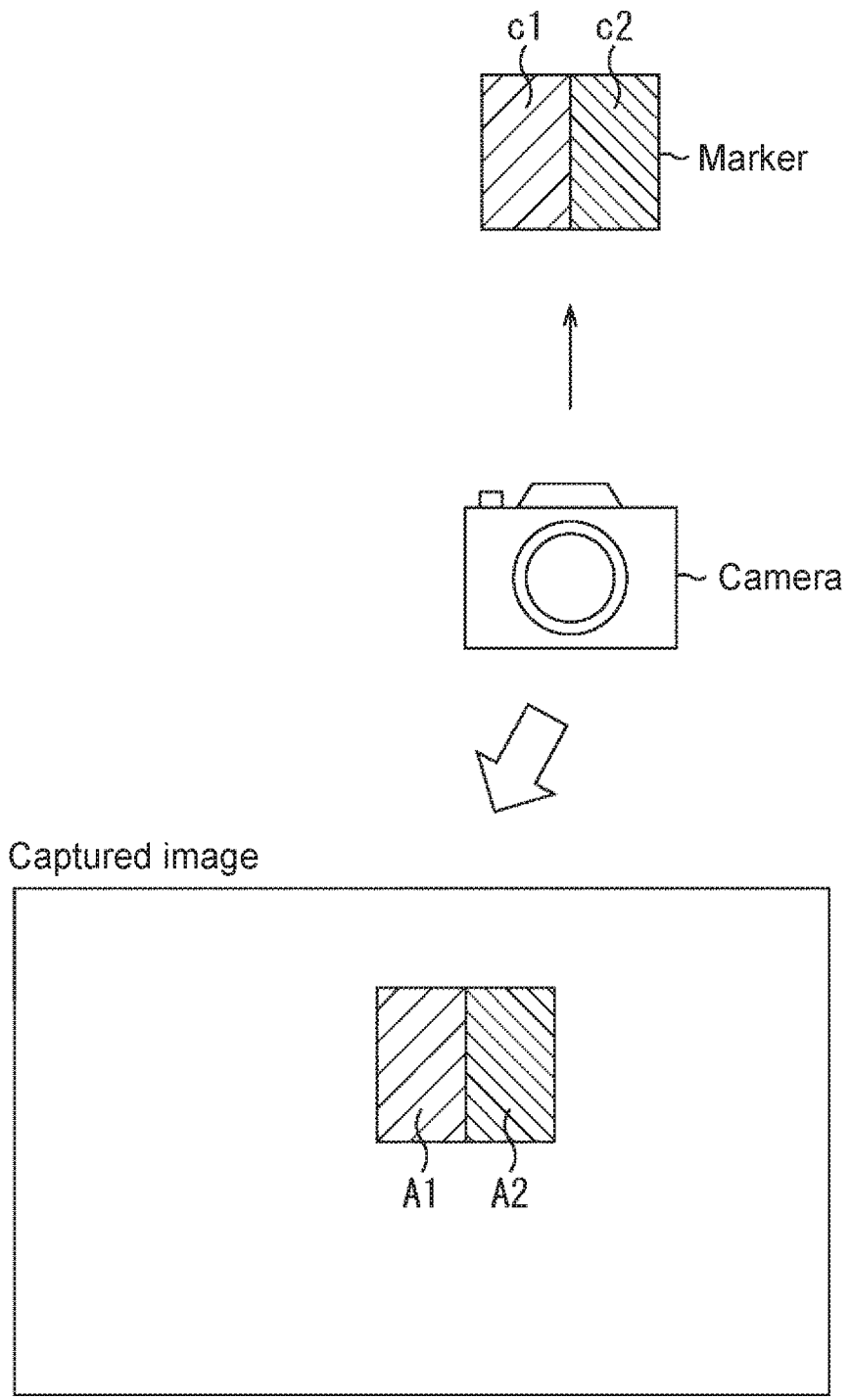
FIG. 8 is a diagram for describing the presence/absence of occurrence of color mixture between two predetermined colors.

FIG. 8 is a diagram for describing the presence/absence of the occurrence of the color mixture between the two predetermined colors.

Note that, for the distance DF between the hues, for example, the difference in mean value of the hue in Expression (1) (absolute difference value) is employed.

As shown in FIG. 8, an image of a marker including two regions adjacent to each other, to which one color c1 and the other color c2 in two predetermined colors c1 and c2 having different hues are provided, and having, for example, the size nearly equal to that of the survey marker 10, is captured with a camera, and a captured image in which the marker appears is obtained. The image capturing of the captured image in which the marker appears can be performed, for example, at a distance nearly equal to that when the aerial image capturing of the survey marker 10 is performed.

Furthermore, (the region of) the marker is detected from the captured image in which the marker appears, and from that marker, a region A1 (estimated to be) provided with the color c1 and a region A2 (estimated to be) provided with the color c2 are identified.

The distance DF between the hues of the respective regions A1 and A2 is then calculated according to Expression (1) by using the pixel values of the pixels of the respective regions A1 and A2.

In a case where the distance DF does not have the threshold TH or more (DF<TH), the colors c1 and c2 are seen as the two colors causing (likely to cause) the color mixture, and those two colors can be excluded as the colors of the circles 11 and 12.

Meanwhile, in a case where the distance DF has the threshold TH or more (DF>=TH), the colors c1 and c2 are seen as the two colors not causing (not likely to cause) the color mixture, and those two colors can be employed as the colors of the circles 11 and 12.

As the threshold TH of the distance DF, for example, a threshold TH expressed by Expression (3) can be employed.

[Math. 3]

$$TH = |H_1 - H_2| \times 0.5 \qquad (3)$$

In Expression (3), $H_1$ represents a mean value of the hues of the pixels of the region provided with the color c1 that appears in a captured image obtained when close-up image capturing (e.g., image capturing at shortest focal distance) is performed for the color c1 only. Similarly, $H_2$ represents a mean value of the hues of the pixels of the region provided with the color c2 that appears in a captured image obtained when the close-up image capturing is performed for the color c2 only.

The mean values of the hues of the pixels of the regions provided with the colors c1 and c2 that appear in the captured images obtained when the close-up image capturing is performed are expected to have, for example, theoretical hues of the colors c1 and c2, respectively. Therefore, for $H_1$ and $H_2$, theoretical hues of the colors c1 and c2 can also be employed.

According to the threshold TH of Expression (3), in a case where the distance DF between the hues is 0.5 times or more the difference between the hues of the colors c1 and c2, $|H_1 - H_2|$, the colors c1 and c2 can be employed as the colors of the circles 11 and 12.

As described above, when the two colors, with which the distance DF has the threshold TH or more, are employed as the colors of the circles 11 and 12, it is possible to suppress lowering of the detection accuracy of the survey marker 10 that results from the color mixture of the colors provided to the adjacent circles 11 and 12, and to accurately detect the survey marker 10.

Note that, regarding the above description, the same holds true for the colors of the circles 12 and 13 adjacent to each other, in addition to the colors of the circles 11 and 12 adjacent to each other. In other words, when the two colors, with which the distance DF has the threshold TH or more, are employed as the colors of the circles 11 and 12, and when the two colors, with which the distance DF has the threshold TH or more, are employed also as the colors of the circles 12 and 13, the detection accuracy of the survey marker 10 can be further improved as compared to the case where the two colors, with which the distance DF has the threshold TH or more, are employed as the colors of the circles 11 and 12 only.

Here, while the rectangular regions are employed as the regions A1 and A2 in FIG. 8, other regions, for example, circular regions similar to the circles 11 and 12 can be employed as the regions A1 and A2.

<Configuration Example of Cloud Server 30>

Figure 9:
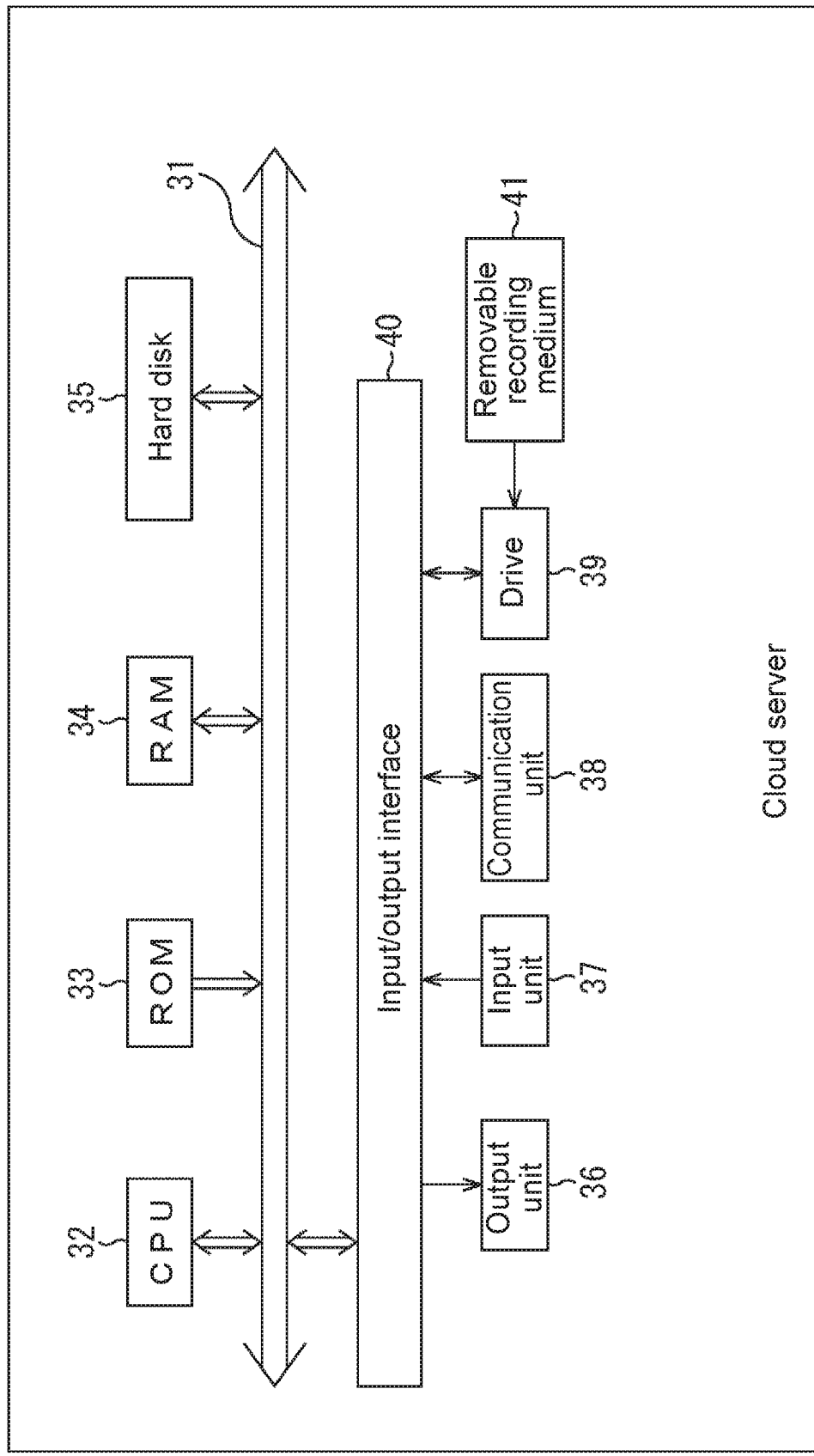
FIG. 9 is a block diagram showing a hardware configuration example of a computer as a cloud server 30.

FIG. 9 is a block diagram showing a hardware configuration example of a computer as the cloud server 30 of FIG. 1.

The cloud server 30 integrates a CPU (Central Processing Unit) 32, and an input/output interface 40 is connected to the CPU 32 via a bus 31.

When an input unit 37 is operated by a user (operator) or the like to input a command via the input/output interface 40, the CPU 32 executes a program stored in a ROM (Read Only Memory) 33 according to the command. Alternatively, the CPU 32 loads the program stored in a hard disk 35 to a RAM (Random Access Memory) 34 to execute the program. Note that the CPU 32 includes one or a plurality of processing circuits.

Accordingly, the CPU 32 performs various types of processing and causes the cloud server 30 to function as an apparatus having a predetermined function. The CPU 32 then outputs processing results of the various types of processing from an output unit 36 as necessary, for example, via the input/output interface 40, or transmits the processing results from the communication unit 38, and further causes the hard disk 35 to record the processing results, for example.

Note that the input unit 37 includes a keyboard, a mouse, a microphone, and the like. Further, the output unit 36 includes an LCD, a speaker, and the like.

Further, a program to be executed by the CPU 32 can be recorded in advance in the hard disk 35 or the ROM 33 as a recording medium integrated in the cloud server 30.

Alternatively, the program can be stored (recorded) on a removable recording medium 41. Such a removable recording medium 41 can be provided as so-called packaged software. Here, examples of the removable recording medium 41 include a flexible disk, a CD-ROM (Compact Disc Read Only Memory), MO (Magneto Optical) disc, a DVD (Digital Versatile Disc), a magnetic disk, and a semiconductor memory.

Further, the program can be installed from the removable recording medium 41 as described above to the cloud server 30, or can be downloaded to the cloud server 30 via a communication network or a broadcasting network and then installed in the built-in hard disk 35. In other words, the program can be wirelessly transferred to the cloud server 30, for example, from a download site via a satellite for digital satellite broadcasting or can be transferred by wire to the cloud server 30 via a network such as a LAN (Local Area Network) or the Internet.

As described above, the CPU 32 executes the program and thus causes the cloud server 30 to function as an apparatus having a predetermined function.

For example, the CPU 32 causes the cloud server 30 to function as an image processing apparatus that performs image processing on a captured image from the camera 21. In this case, the cloud server 30 as the image processing apparatus performs detection processing of detecting the survey marker 10 appearing in the captured image. Therefore, the cloud server 30 can also be a detection apparatus that performs such detection processing.

Figure 10:
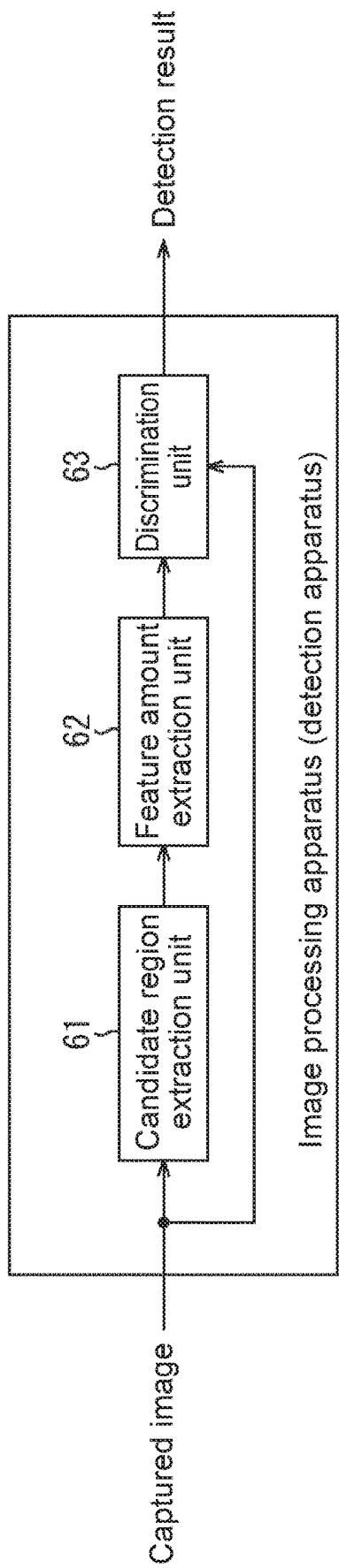
FIG. 10 is a block diagram showing a functional configuration example of the cloud server 30 that functions as an image processing apparatus (detection apparatus).

FIG. 10 is a block diagram showing a functional configuration example of the cloud server 30 that functions as the image processing apparatus (detection apparatus) as described above.

In FIG. 10, the cloud server 30 includes a candidate region extraction unit 61, a feature amount extraction unit 62, and a discrimination unit 63. The candidate region extraction unit 61, the feature amount extraction unit 62, and the discrimination unit 63 are constituted by, for example, the CPU 32 of FIG. 9.

The captured image from the camera is supplied to the candidate region extraction unit 61 and the discrimination unit 63.

The candidate region extraction unit 61 extracts a candidate region, which is a candidate of a region in which (the circle 12 of) the survey marker 10 appears, from a captured image obtained from the camera 21 by image capturing of the survey marker 10, and supplies the candidate region to the feature amount extraction unit 62.

The feature amount extraction unit 62 extracts a feature amount of the candidate region from the candidate region obtained from the candidate region extraction unit 61, and supplies the feature amount to the discrimination unit 63.

The discrimination unit 63 discriminates (the region showing) (the circle 12 of) the survey marker 10 appearing in the captured image on the basis of the feature amount of the candidate region from the feature amount extraction unit 62.

In other words, the discrimination unit 63 discriminates whether the candidate region includes the survey marker 10 or not on the basis of the feature amount of the candidate region.

The discrimination unit 63 then detects the survey marker 10 from the captured image obtained from camera 21, on the basis of a discrimination result of the survey marker 10, and outputs a detection result thereof (e.g., an image of the survey marker 10 or a position of the survey marker 10 within the captured image).

<Detection Processing>

Figure 11:
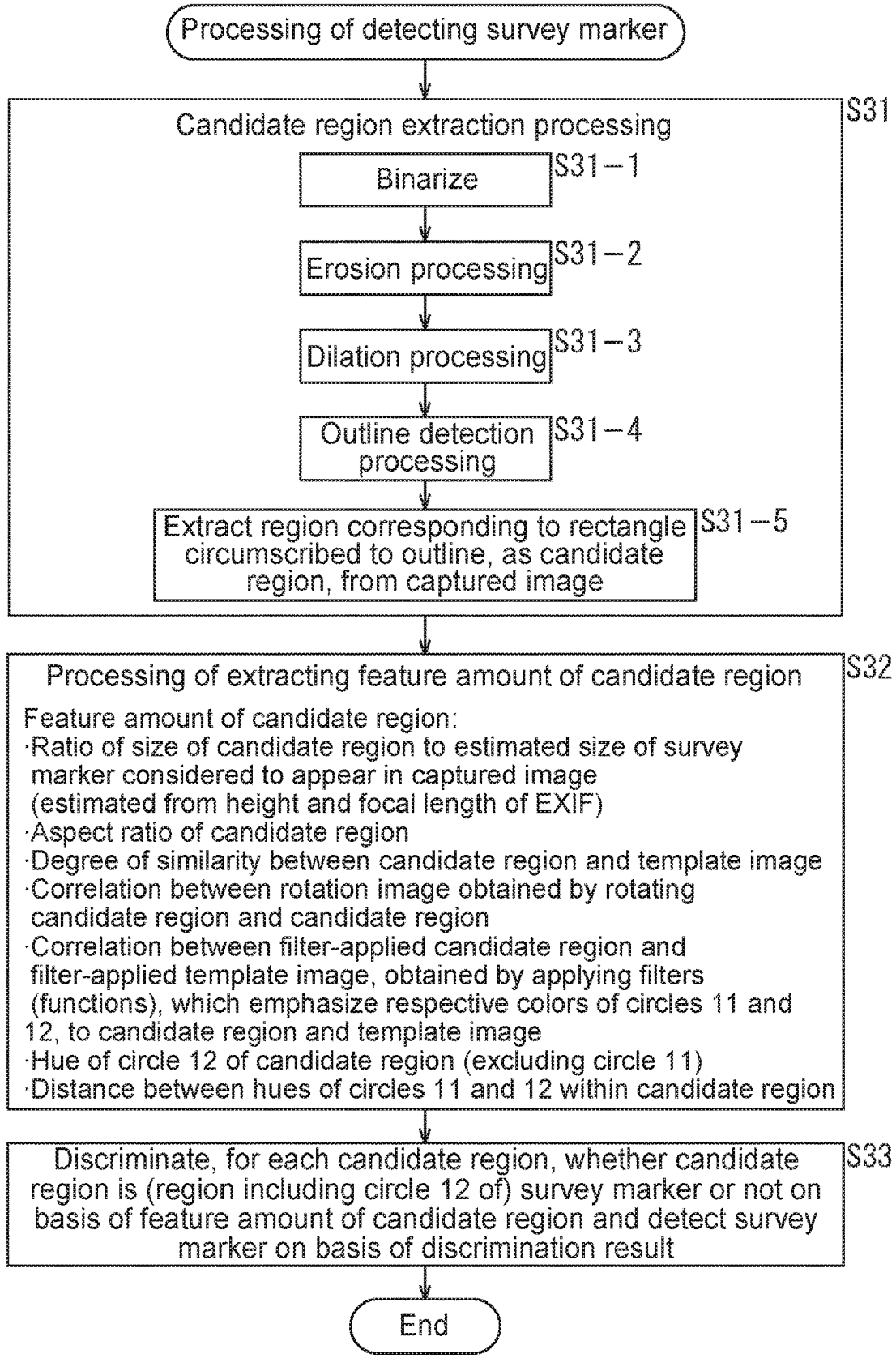
FIG. 11 is a flowchart for describing an example of detection processing of detecting the survey marker 10.

FIG. 11 is a flowchart for describing an example of the detection processing of detecting the survey marker 10, which is performed by the CPU 32 of the cloud server 30 as the image processing apparatus of FIG. 10.

In Step S31, the candidate region extraction unit 61 performs candidate region extraction processing of extracting the candidate region from the captured image obtained from the camera 21.

In the candidate region extraction processing, in Step S31-1, the candidate region extraction unit 61 binarizes (the pixel value of) each pixel of the captured image depending on whether the pixel is a pixel having a color provided to the circle 12 of the survey marker 10 or a pixel having a color other than the color provided to the circle 12.

For example, in a case where the color provided to the circle 12 of the survey marker 10 is a red color, the candidate region extraction unit 61 determines, by using a hue H (Hue) a hue of the red color, which is the color of the circle 12, in the HSV space, a pixel of a hue H considered to be the hue H of the red color in the range of, for example, 320 to 360 (degrees), as the pixel having the color provided to the circle 12, and sets the pixel value thereof to, for example, 1, which is one of 0 and 1.

Further, the candidate region extraction unit 61 determines each of the pixels out of the range having the hue H of 320 to 360 (pixels not determined as the pixel having the color provided to the circle 12) as a pixel that is not determined as the pixel having the color provided to the circle 12, and sets the pixel value thereof to 0, which is the other one of 0 and 1.

Note that the pixels of the captured image can be binarized by using the saturation S (Saturation) and the lightness (luminance) V (Value) in addition to the hue H, of the HSV space, of the color of the circle 12.

For example, in a case where the color provided to the circle 12 of the survey marker 10 is the red color, the pixel having the hue H in the range of 320 to 360 in the HSV space and having the saturation S in the range of 30 to 255 in the HSV space can be determined as a pixel of the color provided to the circle 12.

Alternatively, the pixel having the hue H in the range of 320 to 360 in the HSV space, having the saturation S in the range of 30 to 255 in the HSV space, and having the lightness V in the range of 50 to 255 in the HSV space can be determined as a pixel of the color provided to the circle 12.

As described above, in the candidate region extraction processing, it is possible to perform binarization for extracting the candidate region by using at least the hue among the hue, the saturation, and the lightness of the color of the circle 12.

Further, in the candidate region extraction processing, when the binarization for extracting the candidate region is performed by using at least the hue out of the saturation and the lightness other than the hue of the circle 12, it is possible to extract a more probable candidate region as a region in which the survey marker 10 appears, and also improve the detection accuracy of the survey marker 10.

In the candidate region extraction processing, in Step S31-2, the candidate region extraction unit 61 performs erosion processing on a binarized image obtained by binarizing the captured image and controls the noise of the binarized image.

Furthermore, in the candidate region extraction processing, in Step S31-3, the candidate region extraction unit 61 performs dilation processing on the binarized image after the erosion processing.

After that, in the candidate region extraction processing, in Step S31-4, the candidate region extraction unit 61 performs outline detection processing of detecting the outline of the region of the pixels having the pixel values of 1 in the binarized image obtained after the dilation processing, that is, the outline of the region of the pixels, in which it is assumed that the circle 12 appears, in the captured image.

In the candidate region extraction processing, in Step S31-5, the candidate region extraction unit 61 then extracts a region corresponding to a minimum rectangle circumscribed to the outline detected by the outline detection processing, as a candidate region, from the captured image, and supplies the region to the feature amount extraction unit 62.

In a case where there are a plurality of outlines detected by the outline detection processing, a candidate region is extracted for each of the plurality of outlines.

In Step S32, the feature amount extraction unit 62 performs feature amount extraction processing of extracting the feature amount of a candidate region for each of candidate regions obtained from the candidate region extraction unit 61 and supplies the feature amount of each candidate region, which is obtained by the feature amount extraction processing, to the discrimination unit 63.

In the feature amount extraction processing, the feature amount extraction unit 62 can extract, for example, the following feature amount of the candidate region.

In other words, the feature amount extraction unit 62 can calculate, as the feature amount of the candidate region, for example, a ratio of the size of the candidate region to an estimated size obtained by estimating the size of (the circle 12 of) the survey marker 10 when the survey marker 10 appears in the captured image (hereinafter, the ratio is also referred to as size ratio).

Here, the captured image captured with the camera 21 is recorded in the file of the EXIF (Exchangeable Image File Format) format, for example. In the file of the EXIF format, an image capturing date and time, a focal length, and GPS information such as the latitude, longitude, altitude (height), or the like of an image capturing position are recorded as image capturing metadata.

The feature amount extraction unit 62 estimates the size of the survey marker 10 obtained in a case where the survey marker 10 appears in the captured image, for example, from the altitude and the focal length of the image capturing position recorded in the file of the EXIF format.

According to the size ratio, a candidate region having a too large or too small size can be prevented from being discriminated as (the region of the circle 12 of) the survey marker 10. For example, as the size ratio becomes closer to 1.0, the candidate region is more likely to be discriminated as (the circle 12 of) the survey marker 10.

The feature amount extraction unit 62 can calculate, for example, an aspect ratio of the candidate region as the feature amount of the candidate region.

According to the aspect ratio of the candidate region, a horizontally-long or vertically-long candidate region can be prevented from being discriminated as the survey marker 10. For example, as the aspect ratio of the candidate region becomes closer to 1.0, the candidate region is more likely to be discriminated as the survey marker 10.

The feature amount extraction unit 62 can calculate, for example, a correlation (degree of similarity) between the candidate region and a template image of (the circles 11 and 12 of) the survey marker 10, as the feature amount of the candidate region. For example, as the correlation between the candidate region and the template image becomes higher (the candidate region and the template image have a higher correlation), the candidate region is more likely to be discriminated as the survey marker 10.

Note that the template image of the survey marker 10 is prepared in advance.

Further, for example, a correlation coefficient, a mean value of squared-sums of the differences, or the like can be employed as the correlation.

The feature amount extraction unit 62 can calculate, for example, a correlation between the candidate region and a rotation image obtained by rotating the candidate region, as the feature amount of the candidate region. As the correlation between the candidate region and the rotation image becomes larger, the candidate region is more likely to be discriminated as the survey marker 10.

Since the circles 11 to 13 are concentrically disposed, the survey marker 10 has symmetry. In a case where the survey marker 10 is discriminated by using the correlation between the candidate region and the rotation image obtained by rotating the candidate region, as the feature amount of the candidate region, the discrimination accuracy of the survey marker 10 can be improved by using the symmetry of the survey marker 10.

Note that when the rotation image is calculated, the rotation of the candidate image is performed by a predetermined angle other than the integer multiple of 2n.

For example, the feature amount extraction unit 62 can apply a filter (function), which emphasizes the colors provided to the circles 11 and 12, to the candidate region and the template image and calculate the correlation between the candidate region and the template image after the filter is applied, as the feature amount of the candidate region. For example, as the correlation between the candidate region and the template image after the filter is applied becomes larger, the candidate region is more likely to be discriminated as the survey marker 10.

Note that in addition to the filter that emphasizes the colors provided to the circles 11 and 12, for example, a filter that emphasizes the colors provided to only one of the circles 11 and 12, or the like can be employed as the filter applied to the candidate region and the template image.

The feature amount extraction unit 62 can calculate a distance between the hues of the respective circles 11 and 12 as feature amount of the candidate region.

In other words, assuming that the candidate region is a region circumscribed to the circle 12, the feature amount extraction unit 62 can calculate, as feature amount of the candidate region, the distance between the hues of the respective circles 11 and 12 described in FIG. 7, for example, the distance DF of Expression (1), by using the hues of the pixels in which the circles 11 and 12 considered to exist in the candidate region appear.

For example, in a case where the distance DF between the hues of the respective circles 11 and 12 is equal to or larger than the threshold TH of Expression (3), the candidate region is more likely to be discriminated as the survey marker 10.

In Step S33, the discrimination unit 63 discriminates, for each candidate region, (the region showing) (the circle 12 of) the survey marker 10 appearing in the captured image, in the captured image on the basis of the feature amount of the candidate region from the feature amount extraction unit 62.

In other words, the discrimination unit 63 discriminates whether the candidate region includes the survey marker 10 or not on the basis of the feature amount of the candidate region.

Furthermore, in a case of discriminating that the candidate region includes the survey marker 10, the discrimination unit 63 detects the survey marker 10 from the captured image obtained from the camera 21 on the basis of a discrimination result and outputs a detection result.

In the cloud server 30, as described in FIG. 2, a three-dimensional model of the ground is created by using the detection result of the survey marker 10 thus obtained.

Here, in the discrimination unit 63, an arbitrary method can be employed as the method of discriminating whether the candidate region includes the survey marker 10 or not on the basis of the feature amount of the candidate region. For example, whether the candidate region includes the survey marker 10 or not can be discriminated by performing threshold processing for each feature amount of the candidate region, a decision by majority of a processing result of the threshold processing, weighting addition of a point representing the processing result, or the like. Further, for example, each feature amount of the candidate region can be input to a discriminator including a neural network in which learning is performed in advance, and whether the candidate region includes the survey marker 10 or not can be discriminated on the basis of an output of the discriminator in response to the input.

Note that the feature amount of the candidate region extracted in the feature amount extraction unit 62 is not limited to the feature amounts described above.

However, when the feature amount of the candidate region includes the distance DF between the hues of the respective circles 11 and 12, the survey marker 10 can be detected more accurately.

In other words, for example, in a case where the color of the circle 12 is a red color, the candidate region extraction unit 61 performs (binarization for) the detection of the candidate region by using at least the hue of the circle 12.

Thus, for example, the region in which a pylon of the red color appears may be extracted as a candidate region. In this case, when the feature amount of the candidate region does not include the distance DF between the hues of the respective circles 11 and 12, the possibility of erroneously discriminating that a candidate region in which the pylon appears includes the survey marker 10 is increased.

Meanwhile, when the feature amount of the candidate region includes the distance DF between the hues of the respective circles 11 and 12, the possibility of erroneously discriminating that a candidate region in which the pylon appears includes the survey marker 10 can be suppressed, and the detection accuracy of the survey marker 10 can be improved.

Note that, as described in FIG. 6, in a case where the columnar member 11 of the survey marker 10 integrates the illuminance detection apparatus that detects the illuminance of the survey marker 10, the communication apparatus that performs wireless communication, and the like, the cloud server 30 can perform the detection processing of FIG. 11 by using the illuminance information regarding the illuminance of the survey marker 10 (distribution of the illuminance (luminance) of the survey marker 10) detected by the illuminance detection apparatus from the survey marker 10.

For example, the candidate region extraction unit 61 can extract the candidate region by using the illuminance information.

For example, the candidate region extraction unit 61 can estimate a range of the hue, the saturation, and the lightness of the color of the circle 12 of the survey marker 10 appearing in the captured image by using the illuminance information, determine a pixel having the hue, the saturation, and the lightness within the range, as the pixel of the circle 12, and perform (the binarization for) the extraction of the candidate region.

Further, for example, the discrimination unit 63 can discriminate the survey marker 10 by using the illuminance information.

Specifically, for example, the discrimination unit 63 compares the distance DF between the hues of the respective circles 11 and 12, which is the feature amount of the candidate region, with the threshold TH of Expression (3). In a case where the distance DF has the threshold TH or more on the basis of a comparison result, the survey marker 10 can be discriminated by increasing the possibility of discriminating that the candidate region includes the survey marker 10.

In the discrimination unit 63, the threshold TH descried above, which is used to discriminate the survey marker 10, can be set using the illuminance information.

In other words, the discrimination unit 63 can estimate the hues of the respective pixels of the circles 11 and 12, which are obtained in a case where an image of the survey marker 10 is captured under a illuminance condition indicated by the illuminance information, use mean values of (the estimated values of) the hues, of the respective pixels of the circles 11 and 12, obtained by the estimation, as $H_1$ and $H_2$ of Expression (3), and set the threshold TH of Expression (3).

As described above, by using the illuminance information of the survey marker 10 detected by the illuminance detection apparatus to extract the candidate region or discriminate the survey marker 10, the detection accuracy of the survey marker 10 can be improved.

Figure 12:
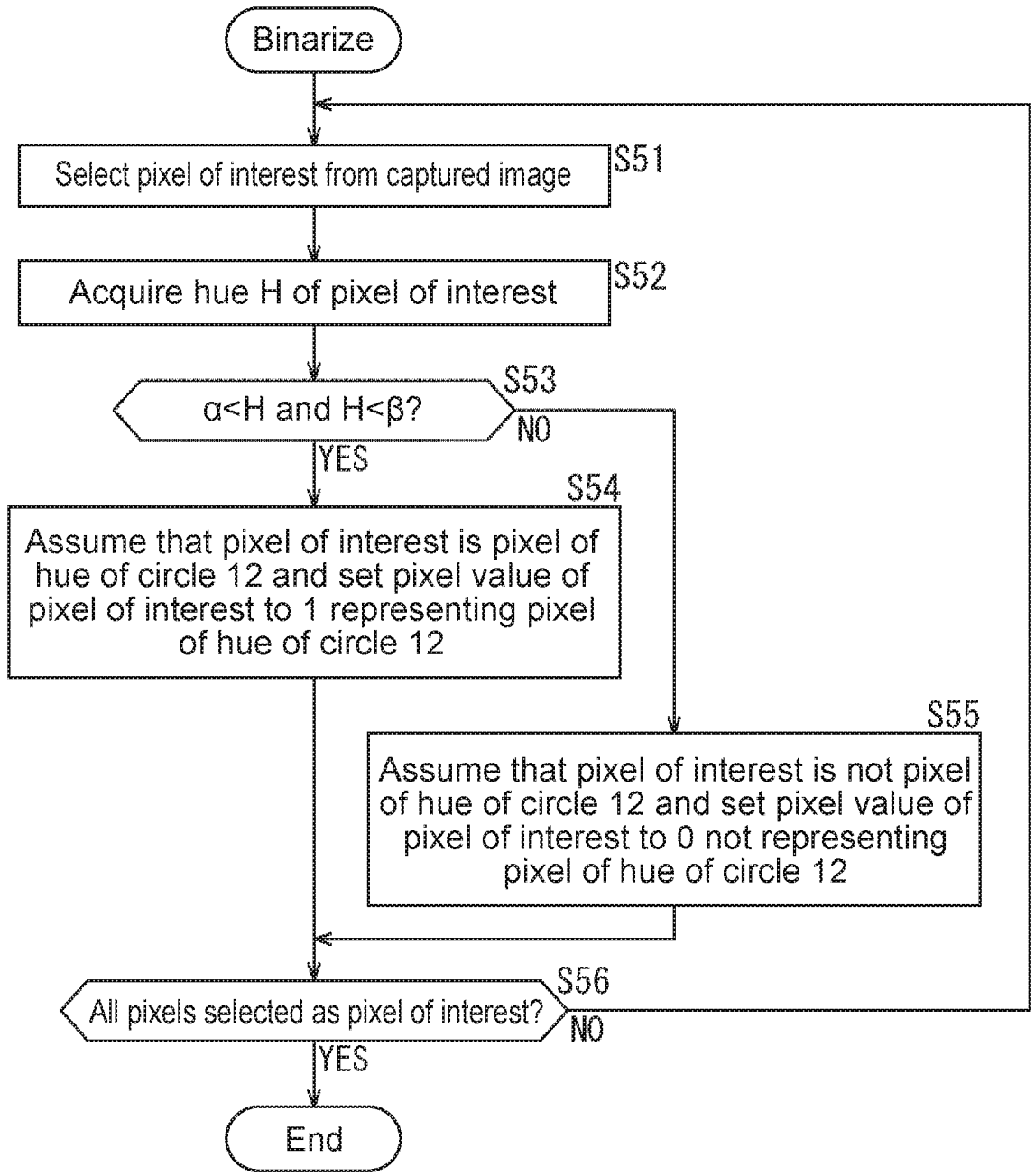
FIG. 12 is a flowchart for describing an example of detailed processing of binarizing each pixel of a captured image.

FIG. 12 is a flowchart for describing an example of detailed processing of binarizing each pixel of the captured image, which is performed in Step S31-1 of FIG. 11.

In Step S51, the candidate region extraction unit 61 selects one of the pixels of the captured image, which is not yet selected as a pixel of interest, as a pixel of interest, and the processing proceeds to Step S52.

In Step S52, the candidate region extraction unit 61 calculates and then acquires the hue H of the pixel of interest, and the processing proceeds to Step S53.

In Step S53, the candidate region extraction unit 61 determines whether the hue H of the pixel of interest is considered as the hue of the color of the circle 12 or not, that is, whether the hue H of the pixel of interest satisfies an expression of $\alpha < H$ and an expression of $H < \beta$ or not.

Here, $\alpha$ and $\beta$ represent the minimum value and the maximum value, respectively, in the range considered as the hue of the color of the circle 12.

In Step S53, in a case where it is determined that the hue H of the pixel of interest satisfies the expression of $\alpha < H$ and the expression of $H < \beta$, the processing proceeds to Step S54. In Step S54, the candidate region extraction unit 61 assumes that the pixel of interest is the pixel of the hue of the circle 12 and sets the pixel value of the pixel of interest to 1 representing the pixel of the hue of the circle 12. The processing proceeds to Step S56.

Further, in Step S53, in a case where it is determined that the hue H of the pixel of interest does not satisfy at least one of the expression of $\alpha < H$ or the expression of $H < \beta$, the processing proceeds to Step S55. In Step S55, the candidate region extraction unit 61 assumes that the pixel of interest is not the pixel of the hue of the circle 12 and sets the pixel value of the pixel of interest to 0 not representing the pixel of the hue of the circle 12. The processing proceeds to Step S56.

In Step S56, the candidate region extraction unit 61 determines whether all the pixels of the captured image are selected as the pixel of interest or not.

In Step S56, when it is determined that all the pixels of the captured image are not yet selected as the pixel of interest, the processing returns to Step S51. In Step S51, the candidate region extraction unit 61 newly selects one of the pixels of the captured image, which is not yet selected as the pixel of interest, as the pixel of interest, and similar processing is repeated thereafter.

Further, in Step S56, when it is determined that all the pixels of the captured image are each selected as the pixel of interest, the binarizing processing is terminated.

FIG. 13 is a diagram for showing an example of a template image of (the circles 11 and 12 of) the survey marker 10, which is used for extracting the feature amount of the candidate region in the feature amount extraction unit 62.

Now, a Gaussian function defined by coefficients a, μ, and σ is expressed as Gaussian(a, μ, σ) as shown in Expression (4).

[Math. 4]

$$\text{Gaussian}(a, \mu, \sigma) = a \exp\left\{-\frac{(x-\mu)^2}{2\sigma^2}\right\} \quad (4)$$

In a case where, for example, a blue color and a red color are employed for the colors of the circles 11 and 12, respectively, an image defined by the Gaussian function shown in, for example, FIG. 13 can be employed as the template image.

A of FIG. 13 shows a first example of the template image, and B of FIG. 13 shows a second example of the template image.

Now, the hue as the pixel value of the template image is represented by y, and a variable x of the Gaussian function Gaussian(a, μ, σ) of Expression (4) represents a distance from the center of the template image.

In this case, the hue y of the template image in A of FIG. 13 is represented by the expression of y=360-Gaussian (a=50, μ=0, σ=0.3). Further, the hue y of the template image in B of FIG. 13 is represented by the expression of y=360-Gaussian(a=100, μ=0, σ=0.3).

Figure 14:
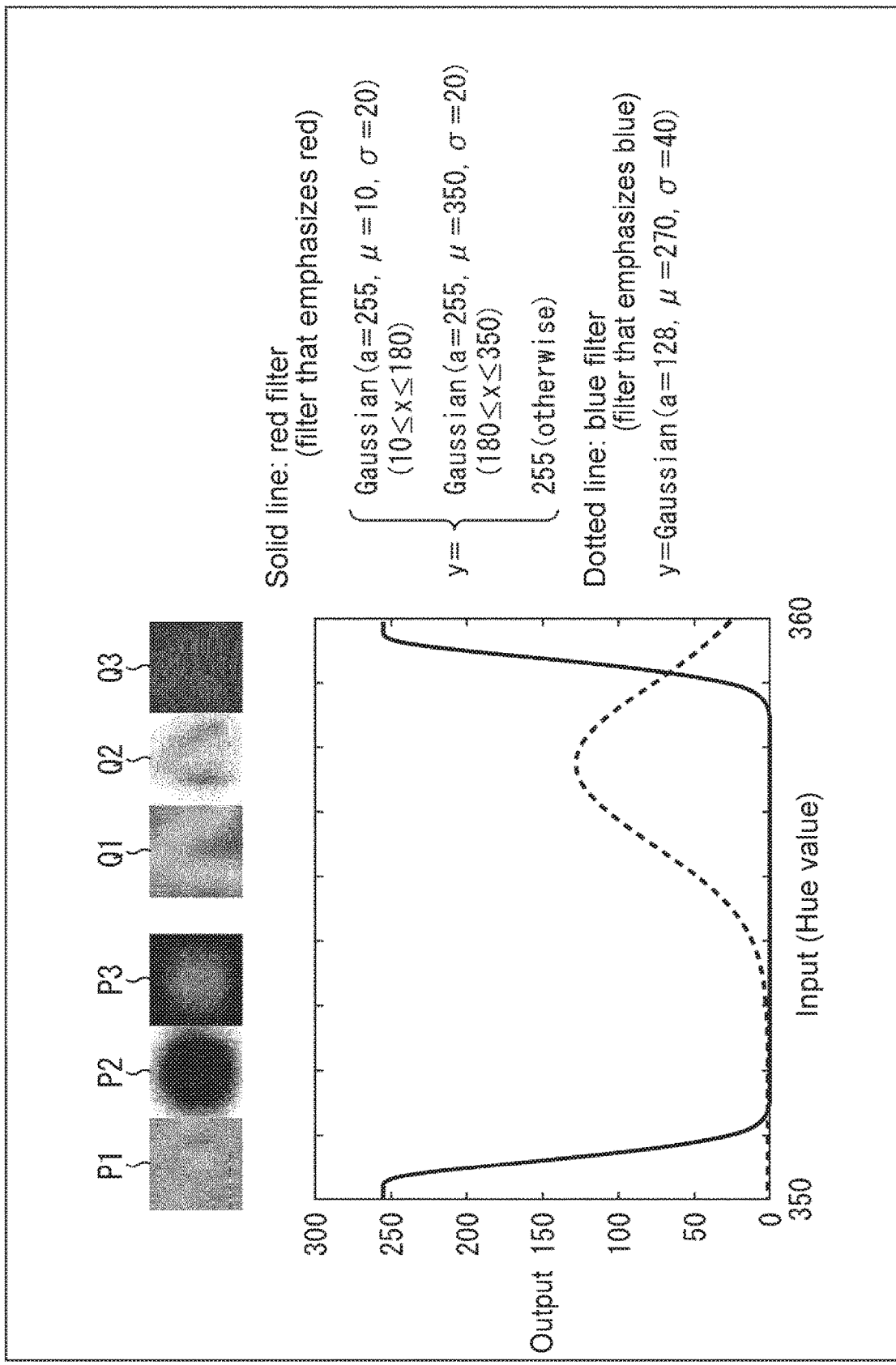
FIG. 14 is a diagram showing an example of filters that emphasize colors provided to the circles 11 and 12 in each of the candidate region and the template image.

FIG. 14 is a diagram showing an example of filters that are used when the colors provided to the circles 11 and 12 in each of the candidate region and the template image are emphasized in the feature amount extraction processing in Step S32 of FIG. 11.

For example, the colors provided to the circles 11 and 12 are the blue color and the red color, respectively, a filter that emphasizes the color provided to the circle 11 is a blue filter that emphasizes the blue color, and a filter that emphasizes the color provided to the circle 12 is a red filter that emphasizes the red color.

Now, the hue as the output of the filter is represented by y, and a variable x of the Gaussian function Gaussian(a, μ, σ) of Expression (4) represents a hue to be input to the filter.

In this case, the red filter is represented by the expression of y=Gaussian(a=255, μ=10, σ=20) (in a case where x is a value in the range of 10<=x<=180), the expression of y=Gaussian(a=255, μ=350, σ=20) (in a case where x is a value in the range of 180<=x<=350), and the expression of y=255 (in a case where x is a value in other ranges).

Further, the blue filter is represented by the expression of y=Gaussian(a=128, μ=270, σ=40).

Note that in FIG. 14, the solid line represents input/output characteristics of the red filter, and the dotted line represents input/output characteristics of the blue filter.

Further, in FIG. 14, an image P1 is an image obtained by resizing a candidate region, in which the circle 12 appears and the hue H is employed as a pixel value, to 50×50 pixels and extracting 30×30 pixels located at the center. Furthermore, an image Q1 is an image obtained by resizing a candidate region, in which the circle 12 does not appear and the hue H is employed as a pixel value, to 50×50 pixels and extracting 30×30 pixels located at the center.

Images P2 and Q2 are images obtained when the blue filter is applied to the images P1 and Q1, respectively, and images P3 and Q3 are images obtained when the red filter is applied to the images P1 and Q1, respectively.

Figure 15:
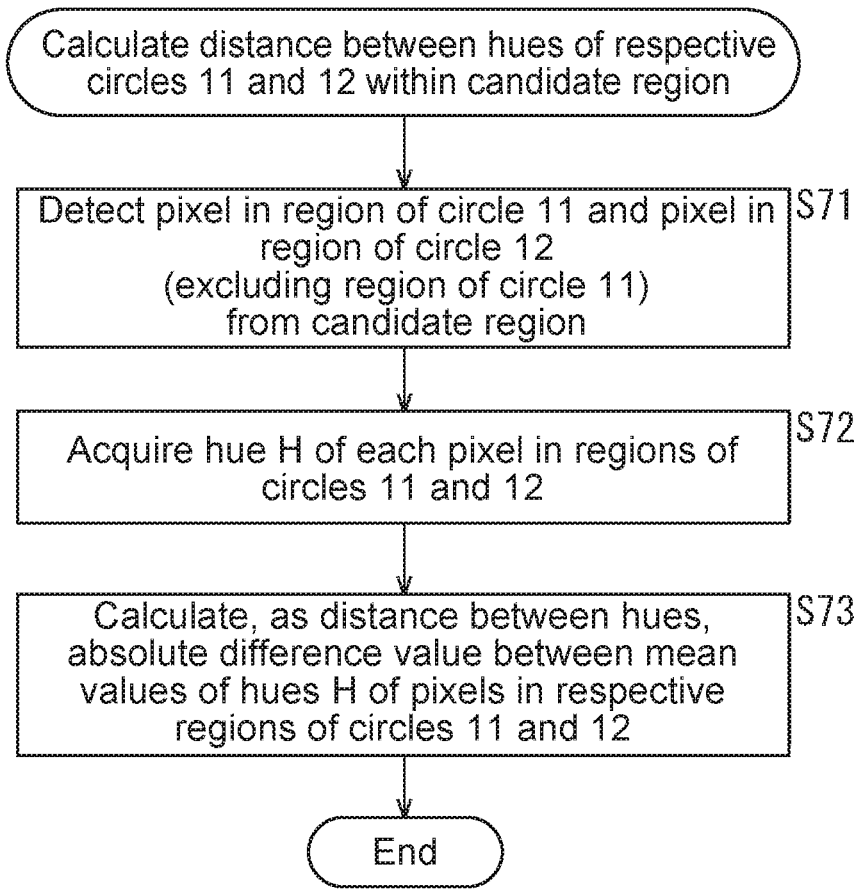
FIG. 15 is a flowchart for describing an example of processing of extracting a distance DF between the hues of the respective circles 11 and 12 as a feature amount.

FIG. 15 is a flowchart for describing an example of the processing of extracting the distance DF between the hues of the respective circles 11 and 12 as a feature amount in the feature amount extraction processing performed in Step S32 of FIG. 11.

In Step S71, the feature amount extraction unit 62 assumes that the candidate region is a region circumscribed to the circle 12, and detects the pixels showing (supposed to show) the respective circles 11 and 12 existing in the candidate region (hereinafter, referred to as a pixel in the region of the circle 11 and as a pixel in the region of the circle 12). The processing proceeds to Step S72.

In Step S72, the feature amount extraction unit 62 calculates and acquires the hue H of each pixel in the region of the circle 11 and also calculates and acquires the hue H of each pixel in the region of the circle 12. The processing proceeds to Step S73.

In Step S73, according to Expression (1), the feature amount extraction unit 62 calculates, as the distance between the hues of the respective circles 11 and 12, an absolute difference value between a mean value of the hues H of the respective pixels in the region of the circle 11 ($\Sigma H_{i,}/N1$ in the first term on the right side of Expression (1)) and a mean value of the hues H of the respective pixels in the region of the circle 12 ($\Sigma H_{i,}/N2$ in the second term on the right side of Expression (1)). The processing is then terminated.

Note that, for example, the single-circle-type marker in FIG. 4 and the multi-circle-type marker in FIG. 5 or 6 can be installed as the survey marker 10 in combination, and in a case where the single-circle-type marker can be detected with sufficient accuracy, the detection of the single-circle-type marker can be performed without performing the detection of the multi-circle-type marker, and in a case where the single-circle-type marker cannot be detected with sufficient accuracy, the detection of the multi-circle-type marker can be performed.

<Configuration Example of Drone 20>

Figure 16:
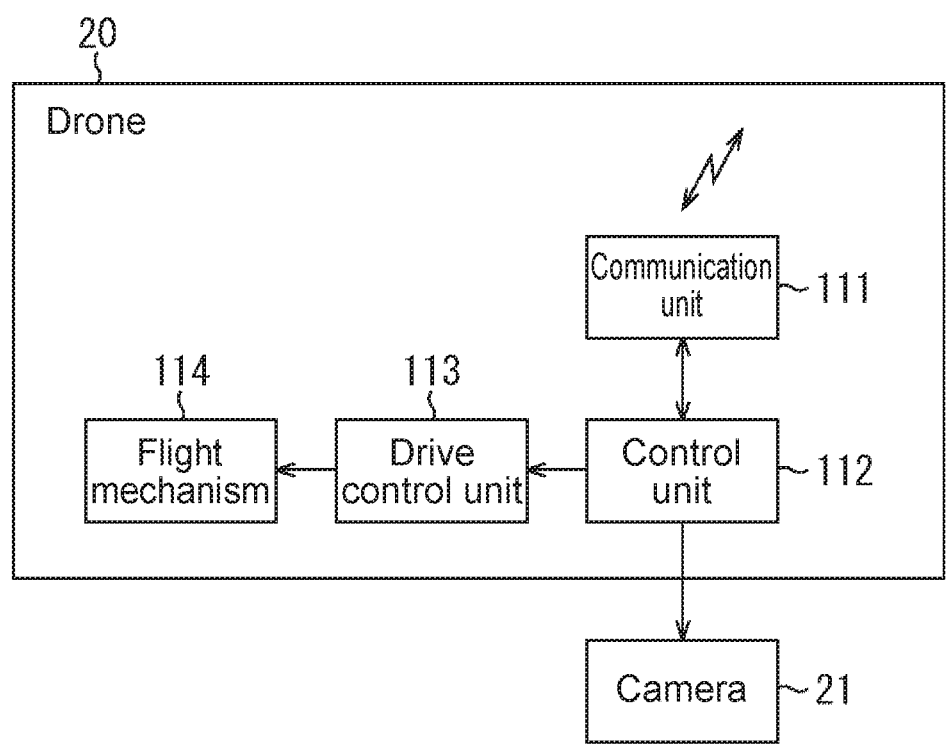
FIG. 16 is a block diagram showing a configuration example of the drone 20.

FIG. 16 is a block diagram showing a configuration example of the drone 20 shown in FIG. 1.

In FIG. 16, the drone 20 includes a communication unit 111, a control unit 112, a drive control unit 113, and a flight mechanism 114.

The communication unit 111 performs communication wirelessly or by wire with the cloud server 30, a controller (proportional control system) (not shown) that operates the drone 20, or another arbitrary apparatus under the control of the control unit 112.

The control unit 112 includes a CPU, a memory, or the like (not shown) and controls the communication unit 111, the drive control unit 113, and the camera 21.

Further, the control unit 112 causes the communication unit 111 to transmit the captured image that is captured with the camera 21.

The drive control unit 113 controls the drive of the flight mechanism 114 under the control of the control unit 112.

The flight mechanism 114 is a mechanism for causing the drone 20 to fly and includes, for example, a motor, a propeller, or the like (not shown). The flight mechanism 114 is driven under the control of the drive control unit 113 and causes the drone 20 to fly.

In the drone 20 thus configured, the control unit 112 controls the drive control unit 113 to drive the flight mechanism 114 according to a signal from the proportional control system, which is received in the communication unit 111, for example. Accordingly, the drone 20 flies according to the operation of the proportional control system.

Further, the control unit 112 controls the camera 21 to perform image capturing according to a signal from the proportional control system. A captured image obtained by image capturing by the camera 21 is transmitted from the communication unit 111 via the control unit 112.

<Another Embodiment of Soil-Volume Measurement System to Which Present Technology is Applied>

Figure 17:
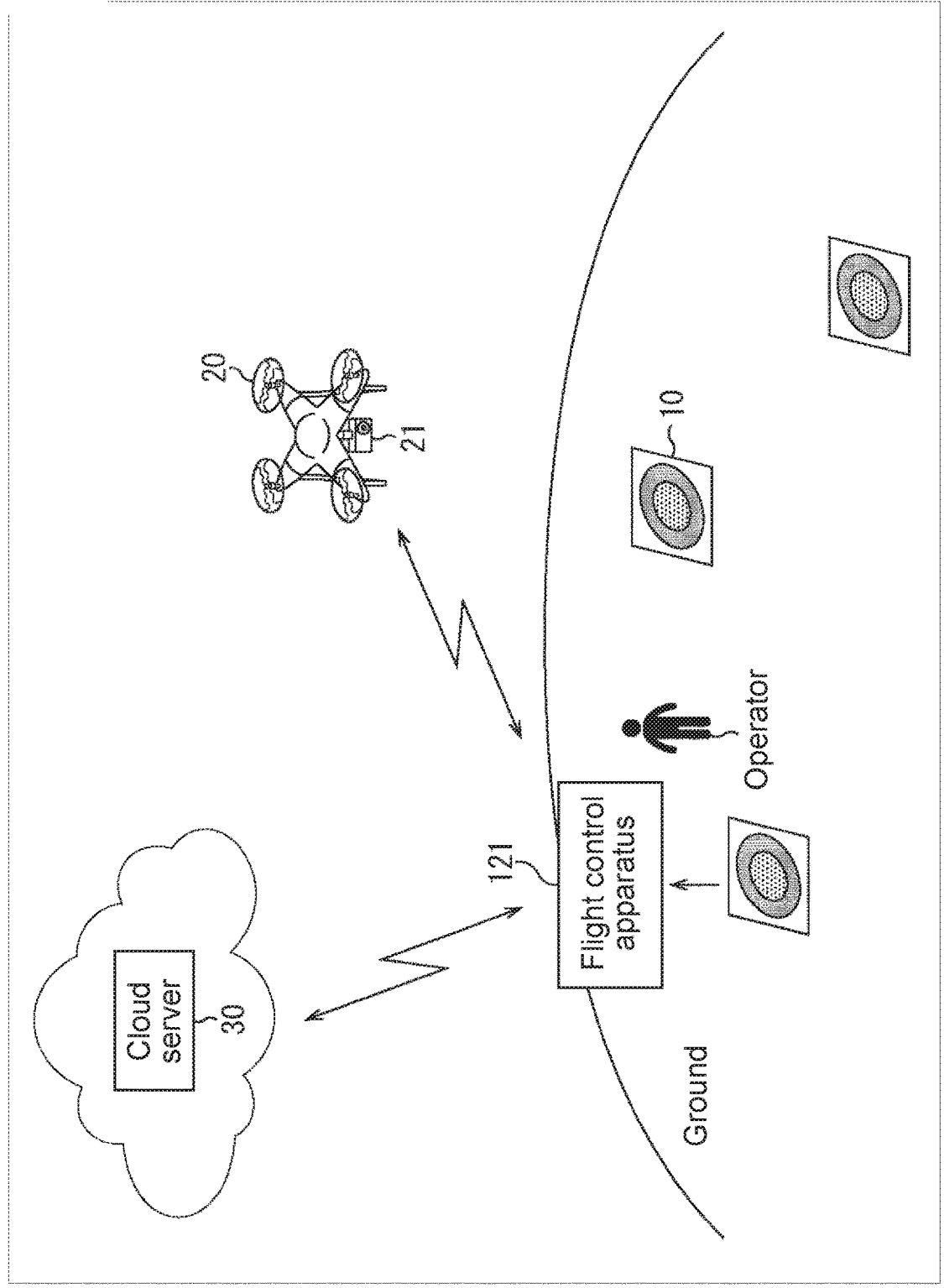
FIG. 17 is a diagram for describing the general outline of another embodiment of the soil-volume measurement system to which the present technology is applied.

FIG. 17 is a diagram for describing the general outline of another embodiment of a soil-volume measurement system to which the present technology is applied.

Note that portions in the figure that correspond to those of FIG. 1 are denoted by the same reference symbols, and description thereof will be hereinafter omitted appropriately.

The soil-volume measurement system of FIG. 17 includes survey markers 10, a drone 20, a cloud server 30, and a flight control apparatus 121.

Therefore, the soil-volume measurement system of FIG. 17 is different from the case of FIG. 1 in that the flight control apparatus 121 is newly provided.

The flight control apparatus 121 includes a dedicated apparatus that functions as GCS (Ground Control Station) (Ground Station). Alternatively, the flight control apparatus 121 is configured when a PC (Personal Computer), a tablet, or an apparatus having a communication function, such as a smartphone, executes a program for causing such an apparatus to function as the GCS.

According to an operation by an operator, the flight control apparatus 121 performs communication with the drone 20 and performs the control of the flight of the drone 20, the acquisition of a position, an image capturing command for the camera 21 equipped with the drone 20, a command of acquisition of a captured image captured with the camera 21, or the like.

According to an operation by the operator, the flight control apparatus 121 can perform detection processing of detecting (an image of) a survey marker 10 from the captured image acquired from the drone 20, and display a detection result of the survey marker 10, which is obtained in the detection processing. The operator can confirm whether an image of the survey marker 10 is suitably captured or not from the detection result of the survey marker 10.

In a case where an image of the survey marker 10 is not suitably captured, for example, in a case where the survey marker 10 cannot be detected in the detection processing, the operator can operate the flight control apparatus 121 to cause the drone 20 to fly again and capture an image of the survey marker 10.

Note that the flight control apparatus 121 can upload the captured image acquired from the drone 20 to the cloud server 30.

Further, for example, as described in FIG. 6 or the like, in a case where the survey marker 10 integrates the illuminance detection apparatus or the like and transmits illuminance information detected by the illuminance detection apparatus, the illuminance information can be received by the flight control apparatus 121.

<Modified Examples of Survey Marker 10 of Multi-circle-type Marker>

Figure 18:
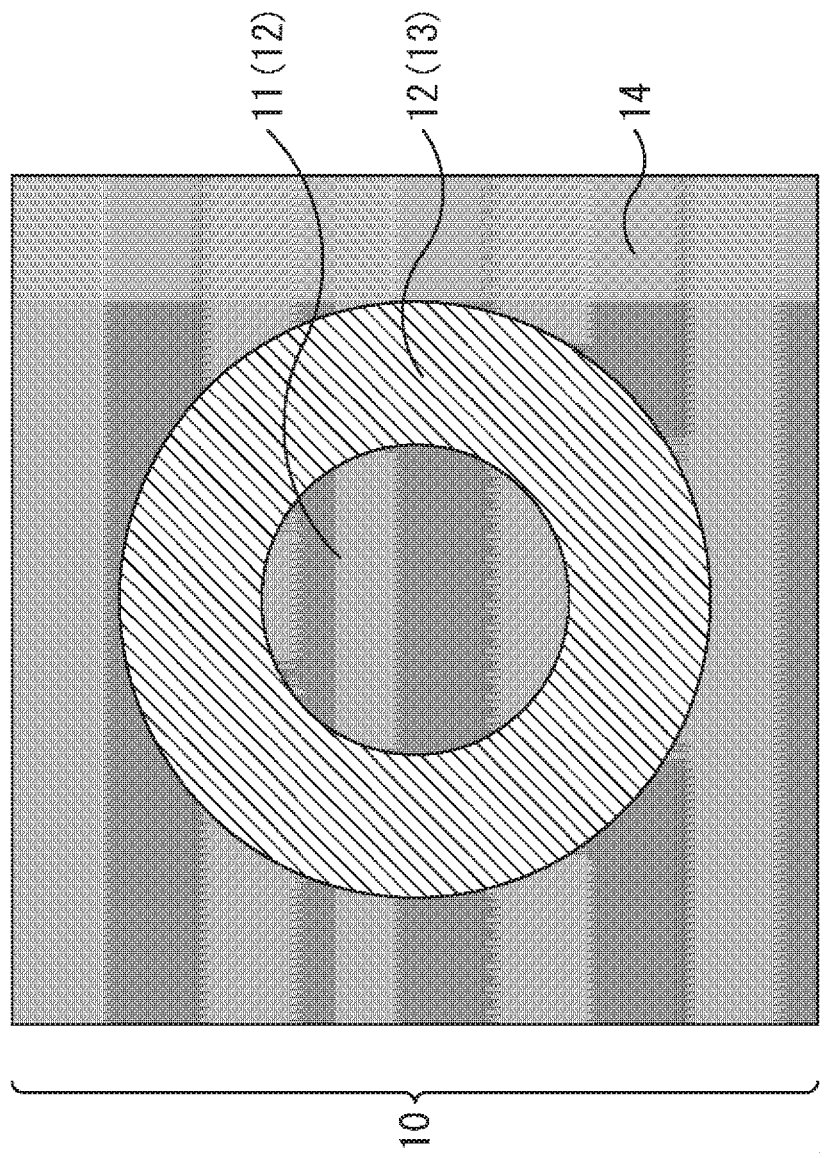
FIG. 18 is a plan view showing a first modified example of the survey marker 10 of the multi-circle-type marker.

FIG. 18 is a plan view showing a first modified example of the survey marker 10 of the multi-circle-type marker.

The survey marker 10 of FIG. 18 includes circles 11 and 12 (or circles 12 and 13) and a frame region 14 and has a configuration in which the circle 13 (or circle 11) is not provided to the survey marker 10 in A of FIG. 5.

Note that the survey marker 10 of FIG. 18 has a configuration in which the frame region 14 is provided to the survey marker 10 in C (or D) of FIG. 5.

In FIG. 18, for example, a black color of an achromatic color, a red color of a chromatic color, and the black color of the achromatic color can be employed as the colors of the circles 11 and 12 (or circle 12 and 13) and the frame region 14, respectively.

Figure 19:
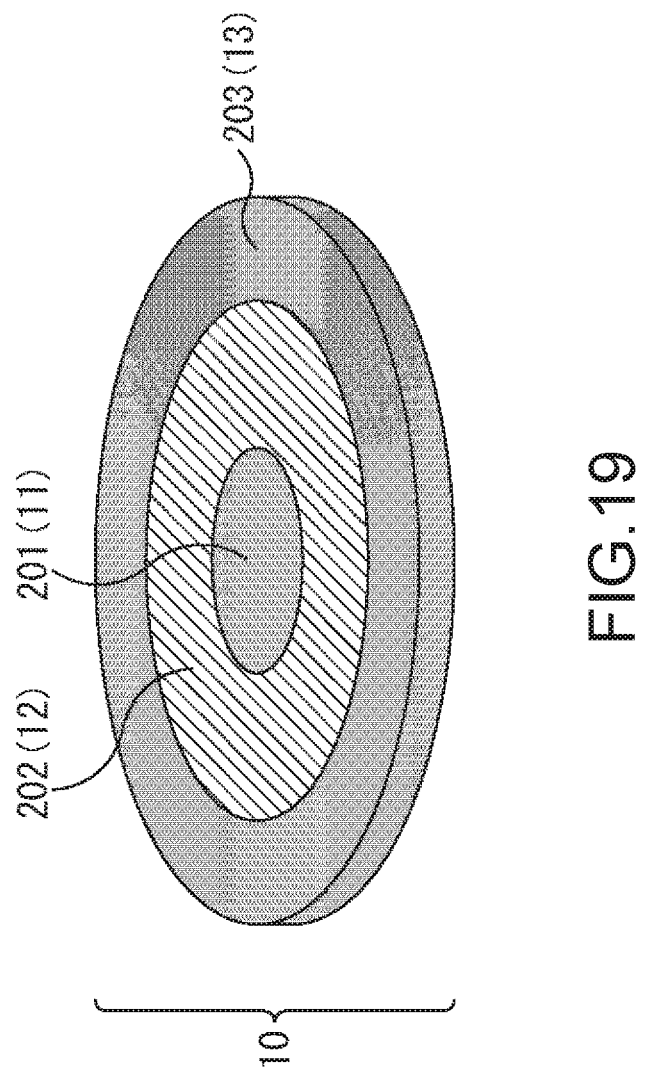
FIG. 19 is a perspective view showing a second modified example of the survey marker 10 of the multi-circle-type marker.

FIG. 19 is a perspective view showing a second modified example of the survey marker 10 of the multi-circle-type marker.

The survey marker 10 of FIG. 19 includes, for example, a columnar member 201 that is to be the circle 11 and has a predetermined height (thickness), a substantially annular member 202 that is to be the circle 12 and has a predetermined height, and a substantially annular member 203 that is to be the circle 13 and has a predetermined height.

In FIG. 19, the members 201 to 203 have the same height.

Additionally, the member 202 has a substantially annular shape obtained by hollowing out the center portion of the column having the predetermined height into a columnar shape, and the columnar member 201 is fitted into the hollow portion, of the member 202, which is hollowed out into the columnar shape.

Similarly, the member 203 has a substantially annular shape obtained by hollowing out the center portion of the column having the predetermined height into a columnar shape, and the substantially annular member 202 is fitted into the hollow portion, of the member 203, which is hollowed out into the columnar shape.

In the survey marker 10 of FIG. 19, the inside of the member 201, 202, or 203 can be configured to be hollow, and the illuminance detection apparatus or the like described in FIG. 6 or the like can be integrated in the member 201, 202, or 203.

Further, the illuminance detection apparatus or the like can be integrated across the multiple members 201 to 203.

In the survey marker 10 of FIG. 6, the height (thickness) of the columnar member that is to be the circle 11 protrudes as compared to the circular member that is to be the circle 12 and the circular member that is to be the circle 13. Therefore, depending on the direction of sunlight, the shadow of the columnar member that is to be the circle 11 is largely formed on the circle 12, and the detection accuracy of the survey marker 10 may degrade.

Meanwhile, in the survey marker 10 of FIG. 19, the members 201 to 203 have the same height, and thus the shadow of the columnar member 201 that is to be the circle 11 is not largely formed on the circle 12 as in the case of FIG. 6. This can suppress degradation of the detection accuracy of the survey marker 10.

Note that the survey marker 10 of FIG. 19 includes the columnar member 201 and the substantially annular members 202 and 203, or alternatively, for example, can be configured by painting the upper surface of one columnar member having a predetermined height in the colors of the circles 11 to 13.

In addition thereto, the survey marker 10 of FIG. 19 can be configured by, for example, painting one columnar member having a predetermined height in the colors of the circles 11 and 12 and fitting the member into the substantially annular member 203, or painting a substantially annular member in the colors of the circles 12 and 13 and fitting the member 201 into it.

Here, for example, a black color of an achromatic color, a red color of a chromatic color, and the black color of the achromatic color are hereinafter employed as the colors of the circles 11 to 13, respectively.

Figure 20:
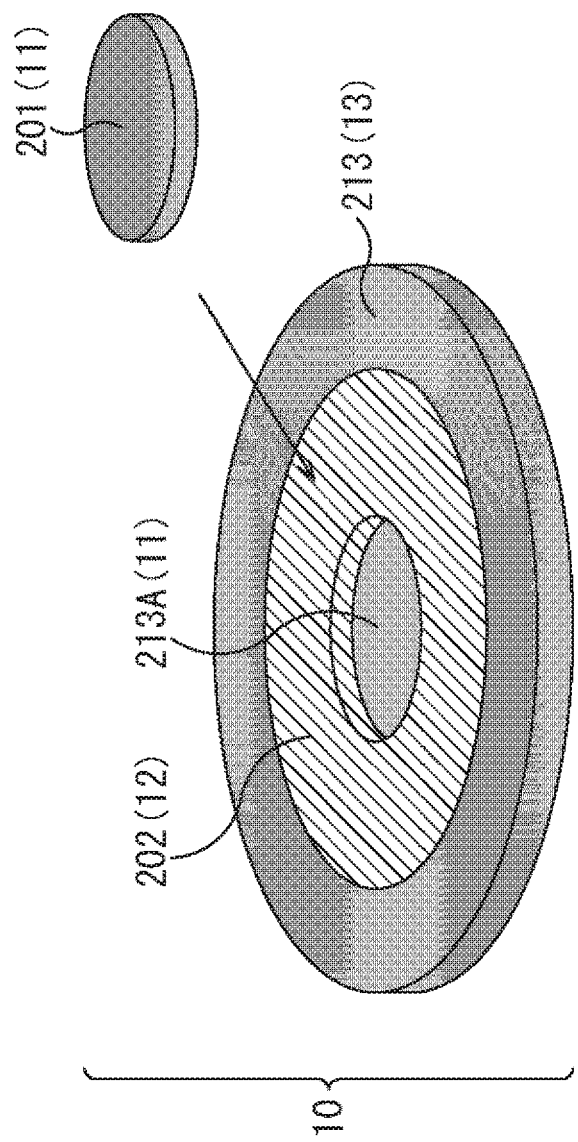
FIG. 20 is a perspective view showing a third modified example of the survey marker 10 of the multi-circle-type marker.

FIG. 20 is a perspective view showing a third modified example of the survey marker 10 of the multi-circle-type marker.

Note that portions in the figure that correspond to those of FIG. 19 are denoted by the same reference symbols, and description thereof will be hereinafter omitted appropriately.

The survey marker 10 of FIG. 20 includes, for example, a columnar member 201 that is to be the circle 11 and has a predetermined height, a substantially annular member 202 that is to be the circle 12 and has a predetermined height, and a substantially annular member 213 that is to be the circle 13 and has a predetermined height.

Therefore, the survey marker 10 of FIG. 20 is different from the case of FIG. 19 in that the member 213 is provided instead of the member 203.

The member 213 has a substantially annular shape obtained by hollowing out the center portion of the column having a predetermined height into a columnar shape with a bottom plate 213A being left, or a substantially annular shape obtained by hollowing out the center portion of the column having a predetermined height into a columnar shape and providing the bottom plate 213A.

Additionally, the substantially annular member 202 is fitted into the hollow portion, of the member 203, which is hollowed out into the columnar shape, and the columnar member 201 is configured to be attachable/detachable to/from the hollow portion, of the member 202, which is hollowed out into a columnar shape.

Note that the bottom plate 213A has the same color as that of the member 201, i.e., here, the black color of the achromatic color, such that the bottom plate 213A exposed from the hollow portion of the member 202 functions as the circle 11 in the survey marker 10 when the columnar member 201 is removed.

Further, the depth of the hollow portion, of the member 213, which is hollowed out into the columnar shape, has the same depth as the height of the members 201 and 202. Therefore, when the member 202 (and member 201) is fitted into the hollow portion of the member 213, the upper surface of the survey marker 10 becomes planar.

In the survey marker 10 of FIG. 20, the inside of the member 201 can be configured to be hollow, and the illuminance detection apparatus or the like described in FIG. 6 or the like can be integrated in the member 201.

In a case where the illuminance information is necessary, the survey marker 10 can be used after the columnar member 201 is mounted in the hollow portion, of the member 202, which is hollowed out into the columnar shape.

Meanwhile, in a case where the illuminance information is not necessary, the survey marker 10 can be used after the columnar member 201 is removed from the survey marker 10.

In the survey marker 10 in which the columnar member 201 is removed, the shadow of the member 202 may be formed on the exposed bottom plate 213A. However, the color of the bottom plate 213A is the black color here, and thus the shadow of the member 202 that may be formed on the exposed bottom plate 213A does not (substantially) affect the detection accuracy of the survey marker 10.

Note that the portion including the members 202 and 213 in FIG. 20 can be configured by, for example, painting a member in the colors of the circles 11 to 13, the member being obtained by hollowing out the center portion of a single columnar member having a predetermined height into a columnar shape while leaving the bottom plate 213A so as to be capable of attaching/detaching the member 201.

Figure 21:
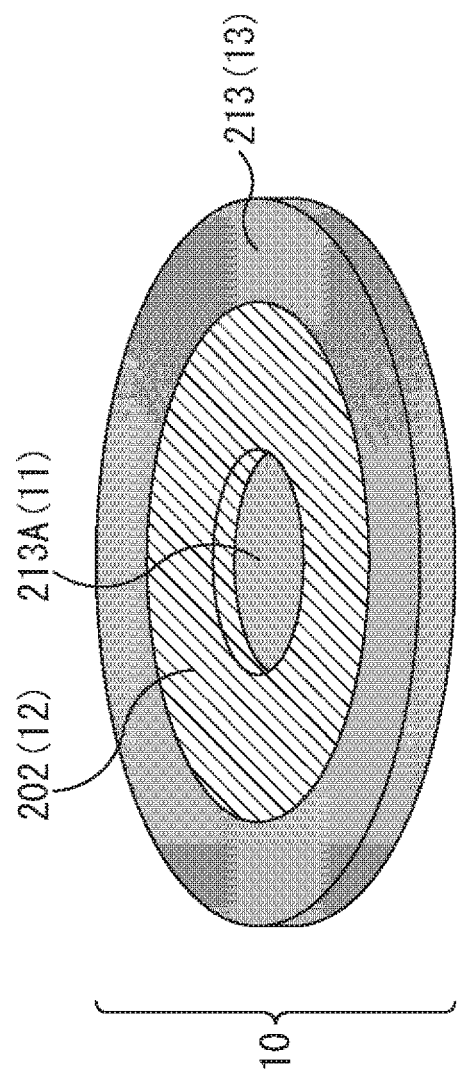
FIG. 21 is a perspective view showing a fourth modified example of the survey marker 10 of the multi-circle-type marker.

FIG. 21 is a perspective view showing a fourth modified example of the survey marker 10 of the multi-circle-type marker.

Note that portions in the figure that correspond to those of FIG. 20 are denoted by the same reference symbols, and description thereof will be hereinafter omitted appropriately.

The survey marker 10 of FIG. 21 includes a member 202 and a member 213.

Therefore, the survey marker 10 of FIG. 21 configured to be similar to the case of FIG. 20 except that the attachable/detachable member 201 is not provided.

In the survey marker 10 of FIG. 21, the inside of the member 202 or 213 can be configured to be hollow, and the illuminance detection apparatus or the like described in FIG. 6 or the like can be integrated in the member 202 or 213.

Further, the illuminance detection apparatus or the like can be integrated across the members 202 and 213.

In the survey marker 10 of FIG. 21, the shadow of the member 202 may be formed on the exposed bottom plate 213A as in the case of the survey marker 10 of FIG. 20 when the columnar member 201 is removed. However, the color of the bottom plate 213A is the black color here, and thus the shadow of the member 202 that may be formed on the exposed bottom plate 213A does not affect the detection accuracy of the survey marker 10.

Figure 22:
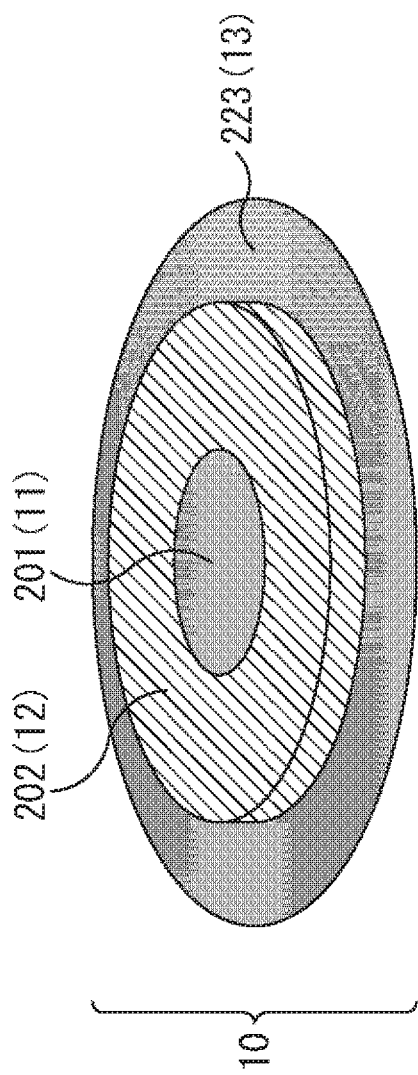
FIG. 22 is a perspective view showing a fifth modified example of the survey marker 10 of the multi-circle-type marker.

FIG. 22 is a perspective view showing a fifth modified example of the survey marker 10 of the multi-circle-type marker.

Note that portions in the figure that correspond to those of FIG. 19 are denoted by the same reference symbols, and description thereof will be hereinafter omitted appropriately.

The survey marker 10 of FIG. 22 includes members 201 and 202 and a plate-like circular member 223 that is to be the circle 13.

Therefore, the survey marker 10 of FIG. 22 is configured to be similar to the case of FIG. 19 except that the member 223 is provided instead of the member 203.

The survey marker 10 of FIG. 22 is configured by, for example, fitting the member 201 into the member 202 and stacking the member 202, into which the member 201 is fitted (or single columnar member configured as the circles 11 and 12), on the member 223.

In the survey marker 10 of FIG. 22, the inside of the member 201 or 202 can be configured to be hollow, and the illuminance detection apparatus or the like described in FIG. 6 or the like can be integrated in the member 201 or 202.

Further, the illuminance detection apparatus or the like can be integrated across the members 201 and 202.

In the survey marker 10 of FIG. 22, the shadow of the member 202 may be formed on the member 223. However, the color of the member 223 that is to be the circle 13 is the black color here, and thus the shadow of the member 202 that may be formed on the member 223 does not affect the detection accuracy of the survey marker 10.

Figure 23:
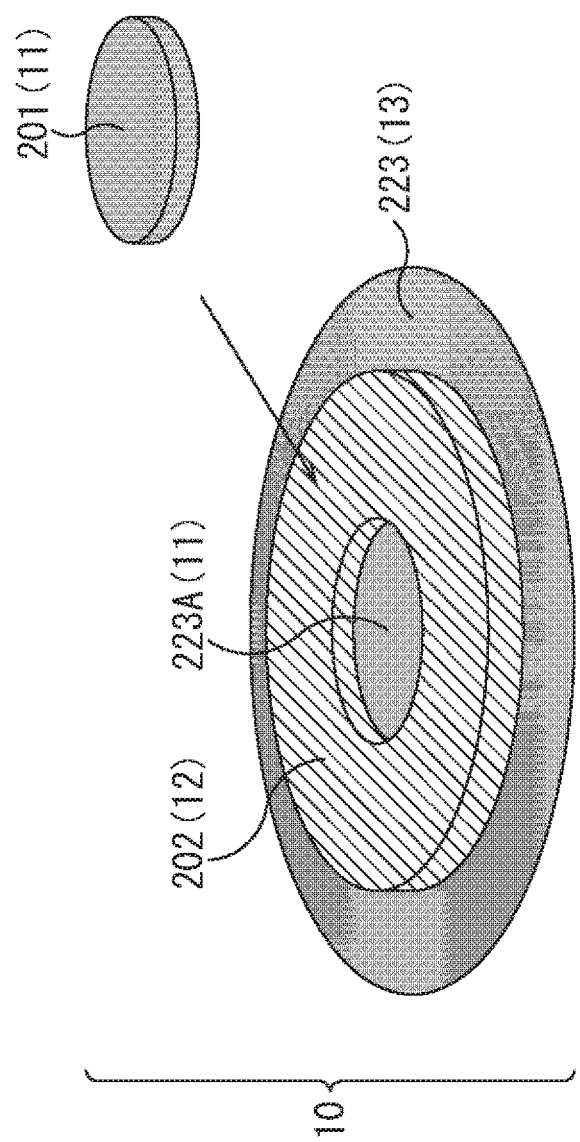
FIG. 23 is a perspective view showing a sixth modified example of the survey marker 10 of the multi-circle-type marker.

FIG. 23 is a perspective view showing a sixth modified example of the survey marker 10 of the multi-circle-type marker.

Note that portions in the figure that correspond to those of FIG. 22 are denoted by the same reference symbols, and description thereof will be hereinafter omitted appropriately.

The survey marker 10 of FIG. 23 includes members 201 and 202 and a member 223.

However, the member 201 is configured to be attachable/detachable to/from the hollow portion, of the member 202, which is hollowed out into a columnar shape.

Further, when the member 201 is removed from the hollow portion of the member 202, a circular portion 223A as a part of the member 223 is exposed from the hollow portion. The circular portion 223A has the same color as that of the member 201, i.e., here, the black color of the achromatic color such that the circular portion 223A functions as the circle 11.

In the survey marker 10 of FIG. 23, the inside of the member 201 can be configured to be hollow, and the illuminance detection apparatus or the like described in FIG. 6 or the like can be integrated in the member 201.

In a case where the illuminance information is necessary, the survey marker 10 can be used after the columnar member 201 is mounted in the hollow portion, of the member 202, which is hollowed out into the columnar shape.

Meanwhile, in a case where the illuminance information is not necessary, the survey marker 10 can be used after the columnar member 201 is removed from the survey marker 10.

In the survey marker 10 in which the columnar member 201 is removed, the shadow of the member 202 may be formed on the exposed circular portion 223A. Further, irrespective of the attachment/detachment of the member 201, the shadow of the member 202 may be formed on the member 223.

However, the color of the member 223 including the circular portion 223A is the black color here, and thus the shadow of the member 202 that may be formed on the member 223 including the circular portion 223A does not affect the detection accuracy of the survey marker 10.

Figure 24:
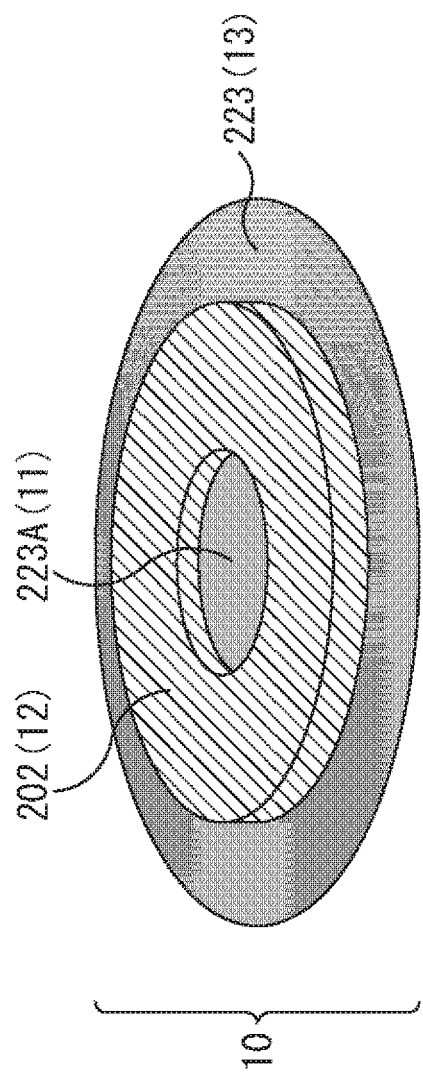
FIG. 24 is a perspective view showing a seventh modified example of the survey marker 10 of the multi-circle-type marker.

FIG. 24 is a perspective view showing a seventh modified example of the survey marker 10 of the multi-circle-type marker.

Note that portions in the figure that correspond to those of FIG. 23 are denoted by the same reference symbols, and description thereof will be hereinafter omitted appropriately.

The survey marker 10 of FIG. 24 is configured to be similar to the case of FIG. 23 except that the attachable/detachable member 201 is not provided.

In the survey marker 10 of FIG. 24, the inside of the member 202 can be configured to be hollow, and the illuminance detection apparatus or the like described in FIG. 6 or the like can be integrated in the member 202.

In the survey marker 10 of FIG. 24, as in the case of FIG. 23, the shadow of the member 202 may be formed on the circular portion 223A and the member 223. However, the color of the member 223 including the circular portion 223A is the black color, and thus the shadow of the member 202 does not affect the detection accuracy of the survey marker 10.

Figure 25:
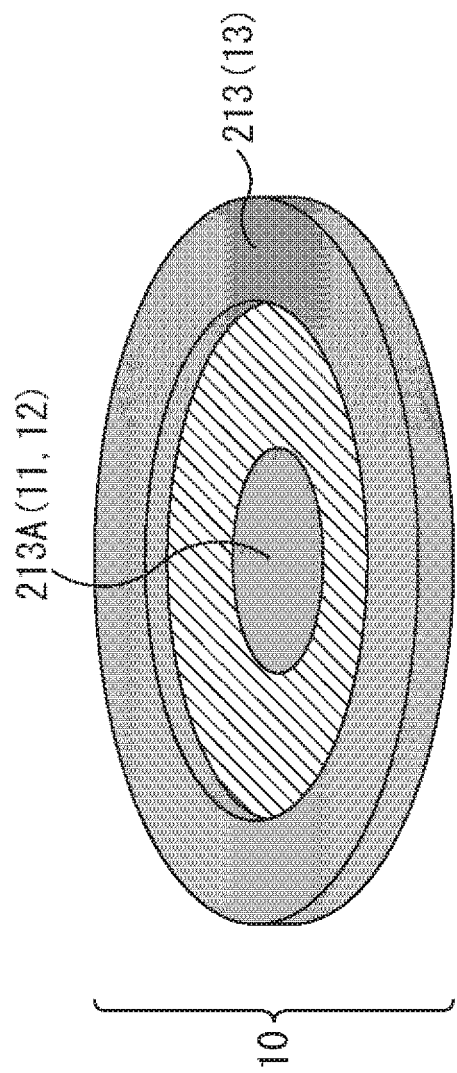
FIG. 25 is a perspective view showing an eighth modified example of the survey marker 10 of the multi-circle-type marker.

FIG. 25 is a perspective view showing an eighth modified example of the survey marker 10 of the multi-circle-type marker.

Note that portions in the figure that correspond to those of FIG. 20 are denoted by the same reference symbols, and description thereof will be hereinafter omitted appropriately.

The survey marker 10 of FIG. 25 includes a member 213.

As described in FIG. 20, the member 213 has a substantially annular shape obtained by hollowing out the center portion of the column having a predetermined height into a columnar shape with a bottom plate 213A being left, or a substantially annular shape obtained by hollowing out the center portion of the column having a predetermined height into a columnar shape and providing the bottom plate 213A.

However, in FIG. 25, the bottom plate 213A of the member 213 is painted so as to function as the circles 11 and 12. In other words, here, a circular region at the center portion of the bottom plate 213A has the black color so as to function as the circle 11, and a circular circumferential region thereof has the red color so as to function as the circle 12.

In the survey marker 10 of FIG. 25, the inside (portion functioning as the circle 13) of the member 213 can be configured to be hollow, and the illuminance detection apparatus or the like described in FIG. 6 or the like can be integrated in the member 213.

Figure 26:
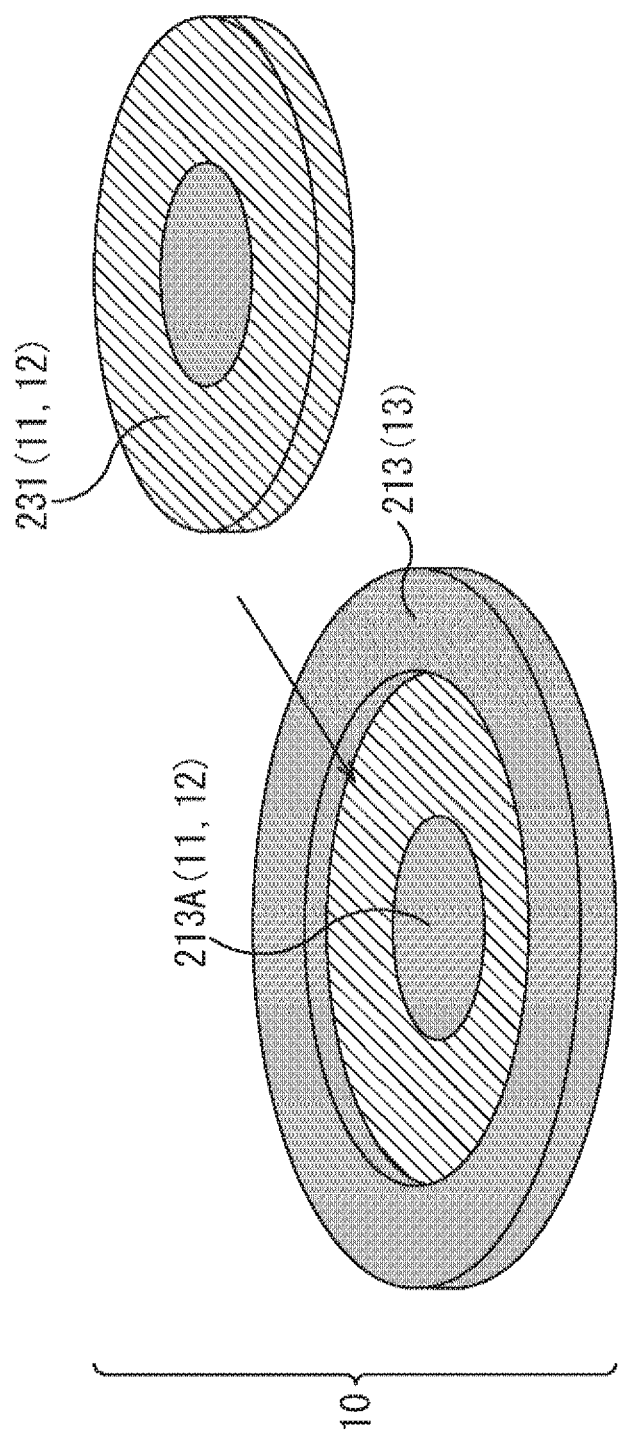
FIG. 26 is a perspective view showing a ninth modified example of the survey marker 10 of the multi-circle-type marker.

FIG. 26 is a perspective view showing a ninth modified example of the survey marker 10 of the multi-circle-type marker.

Note that portions in the figure that correspond to those of FIG. 25 are denoted by the same reference symbols, and description thereof will be hereinafter omitted appropriately.

The survey marker 10 of FIG. 26 includes a columnar member 231 that is to be the circles 11 and 12 and has a predetermined height, and a member 213.

The member 231 has a shape (columnar shape) similar to, for example, the member 202 of FIG. 19, in which the member 201 is fitted. Further, the member 231 is painted to be the circles 11 and 12 so as to function as the circles 11 and 12.

In the survey marker 10 of FIG. 26, the member 231 is attachable/detachable to/from the hollow portion of the member 213.

In the survey marker 10 of FIG. 26, the inside of the member 231 can be configured to be hollow, and the illuminance detection apparatus or the like described in FIG. 6 or the like can be integrated in the member 231.

In a case where the illuminance information is necessary, the survey marker 10 can be used after the member 231 is mounted in the hollow portion of the member 213.

Meanwhile, in a case where the illuminance information is not necessary, the survey marker 10 can be used after the member 231 is removed from the survey marker 10.

Note that the member 231 includes the single columnar member, or alternatively, for example, can include the members 201 and 202 of FIG. 19.

Figure 27:
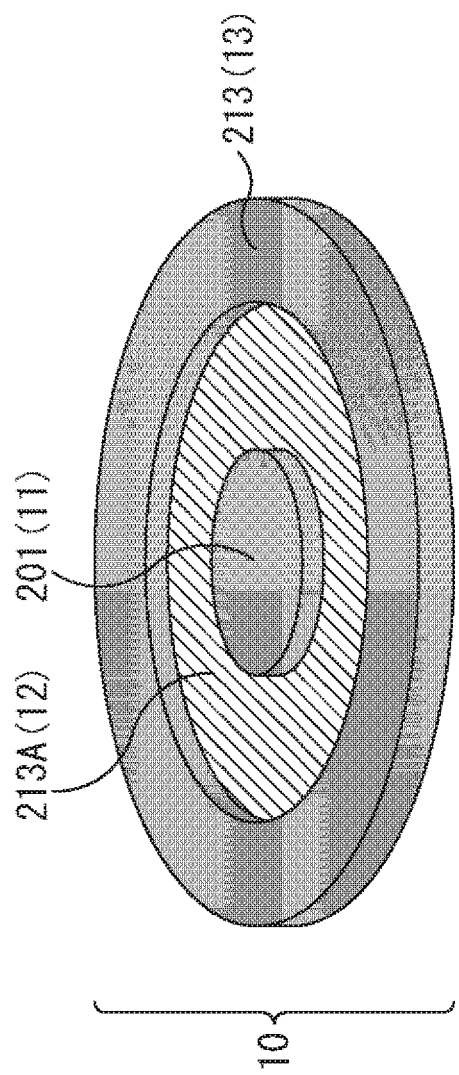
FIG. 27 is a perspective view showing a tenth modified example of the survey marker 10 of the multi-circle-type marker.

FIG. 27 is a perspective view showing a tenth modified example of the survey marker 10 of the multi-circle-type marker.

Note that portions in the figure that correspond to those of FIG. 19 or 25 are denoted by the same reference symbols, and description thereof will be hereinafter omitted appropriately.

The survey marker 10 of FIG. 27 is configured by, for example, stacking the member 201 in a region of the bottom plate 213A of the member 213, the region being to be the circle 11.

In the survey marker 10 of FIG. 27, the inside (portion functioning as the circle 13) of the member 201 or the member 213 can be configured to be hollow, and the illuminance detection apparatus or the like described in FIG. 6 or the like can be integrated in the member 201 or the member 213.

Further, in the survey marker 10 of FIG. 27, the members 201 and 213 can be configured to be hollow, and the illuminance detection apparatus and the like can be integrated separately in the member 201 and the member 213.

Note that as shown in FIG. 27, the survey marker 10 in which the circles 11 and 13 each have a certain thickness is not limited to the configurations described above. In other words, the survey marker 10 in which the circles 11 and 13 each have a certain thickness can be configured, for example, such that one or both of the portion that is to be the circle 11 and the portion that is to be the circle 13 are attachable/detachable.

Figure 28:
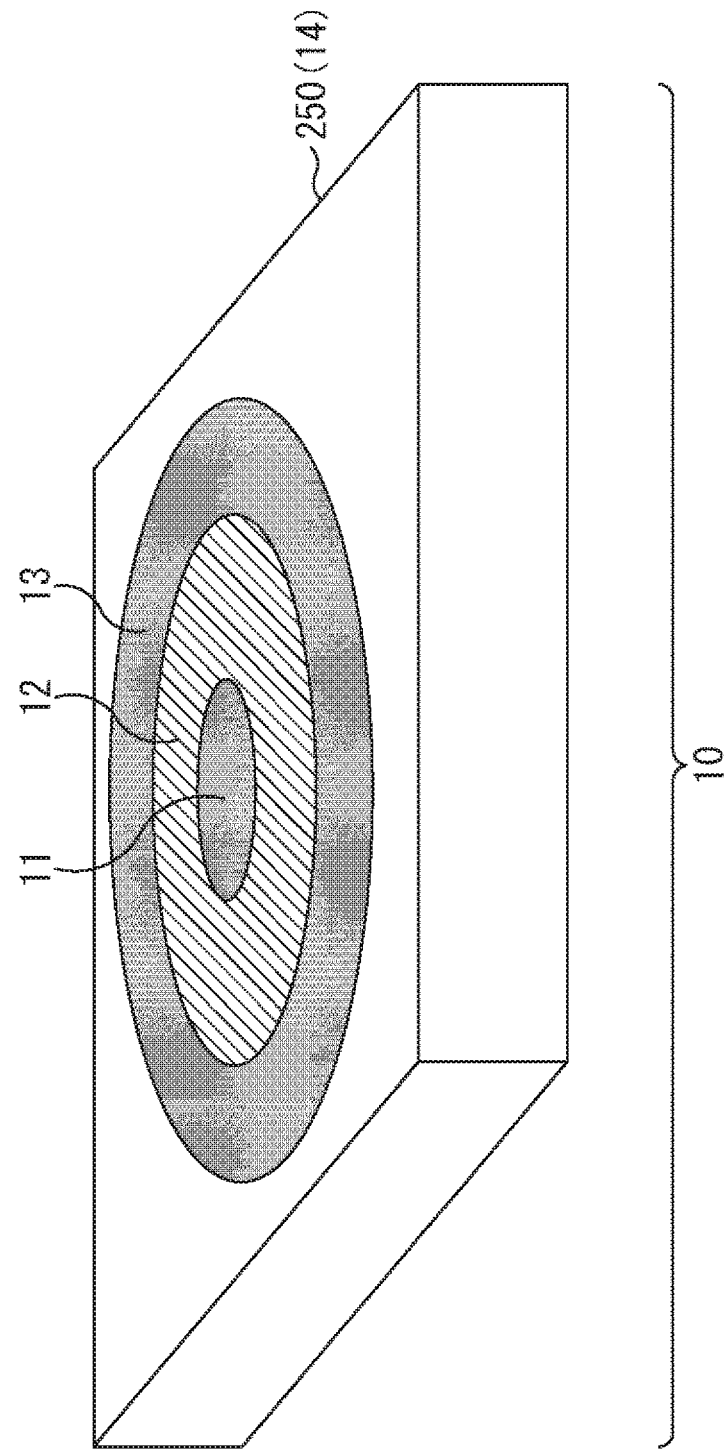
FIG. 28 is a perspective view showing a eleventh modified example of the survey marker 10 of the multi-circle-type marker.

FIG. 28 is a perspective view showing an eleventh modified example of the survey marker 10 of the multi-circle-type marker.

The survey marker 10 of FIG. 28 includes a plate-like member 250 having a certain thickness.

The circle 11 to the circle 13 are depicted by printing or the like on the upper surface of the member 250.

The member 250 is made of, for example, a translucent material in a white color or the like, and can be configured to be hollow.

For example, a lighting apparatus (not shown) can be integrated in the member 250.

In this case, when the lighting apparatus is turned on, the survey marker 10 can be caused to light.

When the survey marker 10 is caused to light, image capturing in a state where the survey marker 10 is detectable can be performed even in a dark situation such as night, and the survey marker 10 can be used as a landmark or the like for landing of the drone 20.

Figure 29:
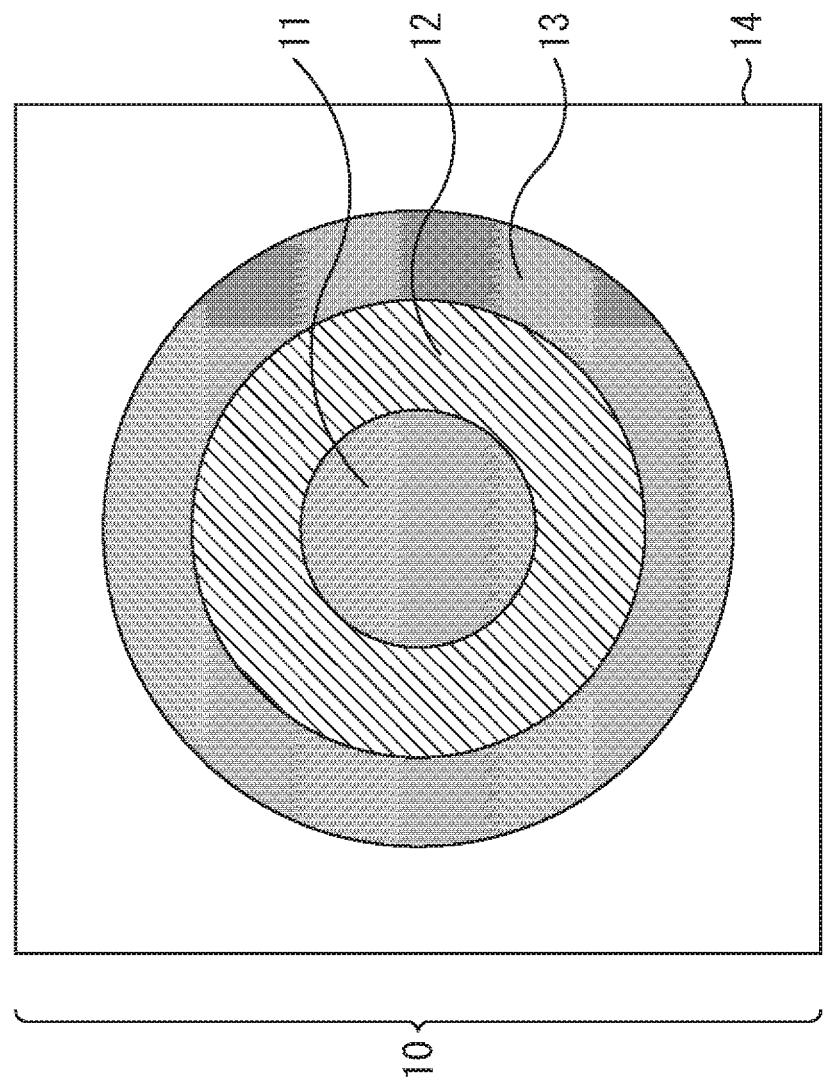
FIG. 29 is a plan view showing a twelfth modified example of the survey marker 10 of the multi-circle-type marker.

FIG. 29 is a plan view showing a twelfth modified example of the survey marker 10 of the multi-circle-type marker.

In the survey marker 10 of FIG. 29, for example, a portion of the circle 12 in the red color and a portion of the frame region 14 in the white color include, for example, a luminous body such as an LED (Light Emitting Diode).

When the portion of the circle 12 in the red color and the portion of the frame region 14 in the white color are caused to light, image capturing in a state where the survey marker 10 is detectable can be performed even in a dark situation such as night, and the survey marker 10 can be used as a landmark or the like for landing of the drone 20.

Figure 30:
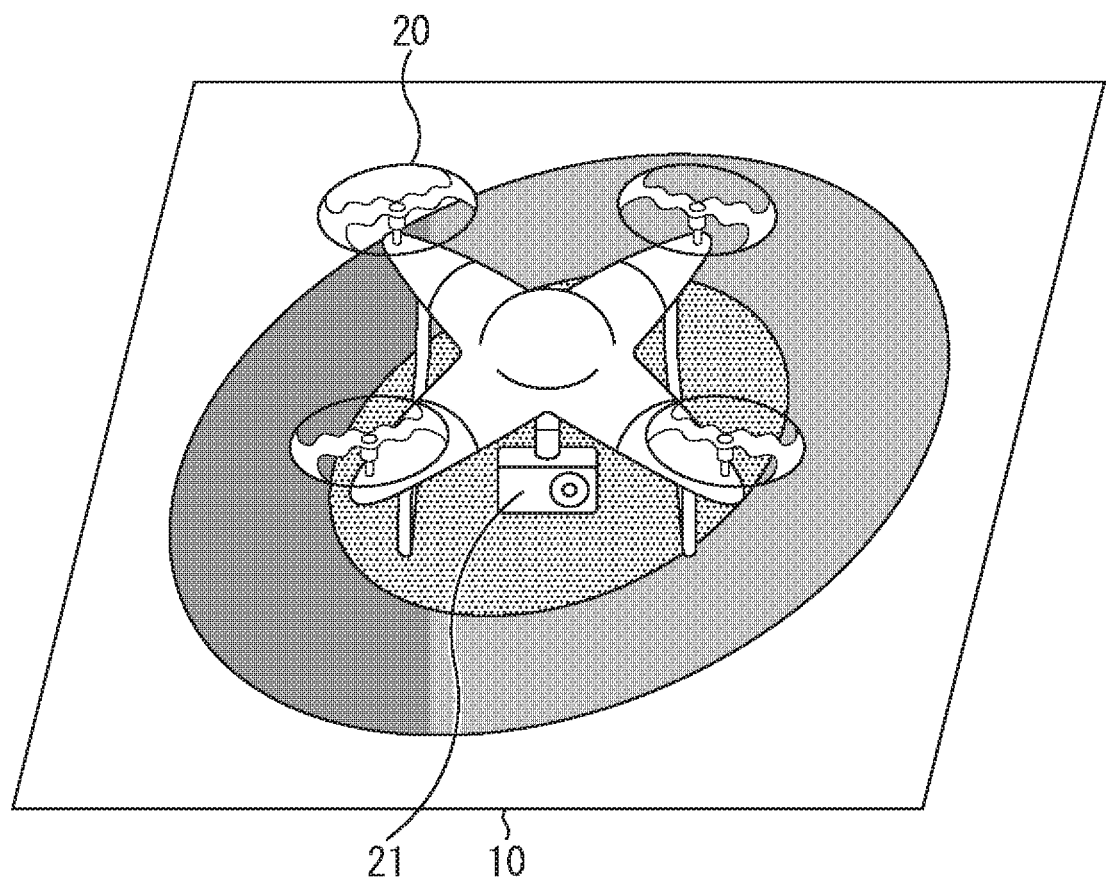
FIG. 30 is a perspective view showing a thirteenth modified example of the survey marker 10 of the multi-circle-type marker.

FIG. 30 is a perspective view showing a thirteenth modified example of the survey marker 10 of the multi-circle-type marker.

In the survey marker 10 of FIG. 30, a pattern of the survey marker 10 is depicted by printing or the like on a landing pad for a drone. Therefore, the survey marker 10 of FIG. 30 functions as a survey marker and also as a landing pad.

Here, the landing pad can be used for preventing sand or the like on the ground from being raised at the takeoff and landing of the drone and from entering the motor or the like of the drone, and for clarifying the landing place of the drone, for example.

According to the survey marker 10 of FIG. 30, in the drone 20, the position of the landing pad that is the survey marker 10 can be detected from the captured image.

Furthermore, according to the survey marker 10 of FIG. 30, in the drone 20, after a position at which the camera 21 is to be attached is taken into consideration, a flight state is controlled such that the survey marker 10 appearing in a captured image captured with the camera 21 is always at a constant position, the takeoff and landing perpendicular to the survey marker 10 can be performed, and the convenience of the landing pad that is the survey marker 10 can be enhanced.

Further, according to the survey marker 10 of FIG. 30, a pattern change of the survey marker 10 that appears in the captured image, or the point of time of the takeoff and landing of the drone after the takeoff and landing is recognized can be recorded. Such a point of time can be used for automatically creating the report of the soil-volume measurement or the like.

Other Embodiments

In the above description, the marker having a planar shape and including a plurality of circles concentrically disposed and each having a different radius, the circles adjacent to each other among the plurality of circles each having a different hue, is employed as the survey marker 10. However, a marker having a planar shape and including a plurality of circles concentrically disposed and each having a different radius, the circles adjacent to each other among the plurality of circles each having a different luminance or hue, can be employed as the survey marker 10.

In other words, in the embodiment in FIGS. 1 to 30, the "hue" can be replaced with the "luminance or hue".

For example, in FIG. 5 or the like, circles that are adjacent to each other and each have a different luminance or hue can be employed as the circles 11 to 13.

Note that, in the survey marker 10, the adjacent circles only need to each have a different luminance or hue. Therefore, if the adjacent circles 11 and 12 each have a different luminance or hue and the adjacent circles 12 and 13 each have a different luminance or hue, the circles 11 and 13 that are not adjacent to each other may have the same luminance or hue.

Further, in the survey marker 10, the adjacent circles may be different in luminance only or in hue only, or may be different in both of luminance and hue.

In a case where the survey marker 10 is detected by using a distance between the luminances of the respective circles 11 and 12 adjacent to each other or by using a distance between the hues as necessary, it is effective that the combination of the colors of the respective circles 11 and 12 is a combination whose possibility of existing in nature is as low as possible.

Furthermore, it is effective that the combination of the colors of the respective circles 11 and 12 is a combination in which the luminances or hues of the respective colors are as different as possible.

Further, it is effective that the combination of the colors of the respective circles 11 and 12 is a combination in which the degree of the color mixture is as low as possible when image capturing is performed from a certain height, i.e., for example, a combination in which a distance between the luminance or hue of the circle 11 and the luminance or hue of the circle 12, which are obtained from the captured image, is as large as possible.

Here, for the distance between the hues of the respective circles 11 and 12, as described in FIG. 7, a distance between the peaks of two respective distributions (difference in hue between peaks) existing in the hue histogram can be employed.

Similarly, for the distance between the luminances of the respective circles 11 and 12, a distance between the peaks of two respective distributions (difference in luminance between peaks) in a luminance histogram for the pixels of the circles 11 and 12 detected from the captured image can be employed, the two respective distributions including a distribution with a peak of a first luminance and a distribution with a peak of a second luminance.

Further, for the distance between the hues of the respective circles 11 and 12, for example, as described in FIG. 7, a difference in integrated value such as a mean value of the hues of the respective pixels between the circles 11 and 12 detected from the captured image (e.g., DF or the like in Expression (1)) can be employed. However, similarly, a difference in integrated value such as a mean value of the luminances of the respective pixels between the circles 11 and 12 detected from the captured image can also be employed as the distance between the luminances of the respective circles 11 and 12.

Hereinafter, description will be given on the detection of the survey marker 10, which is performed by using the luminance, in addition, the hue as necessary.

Figure 31:
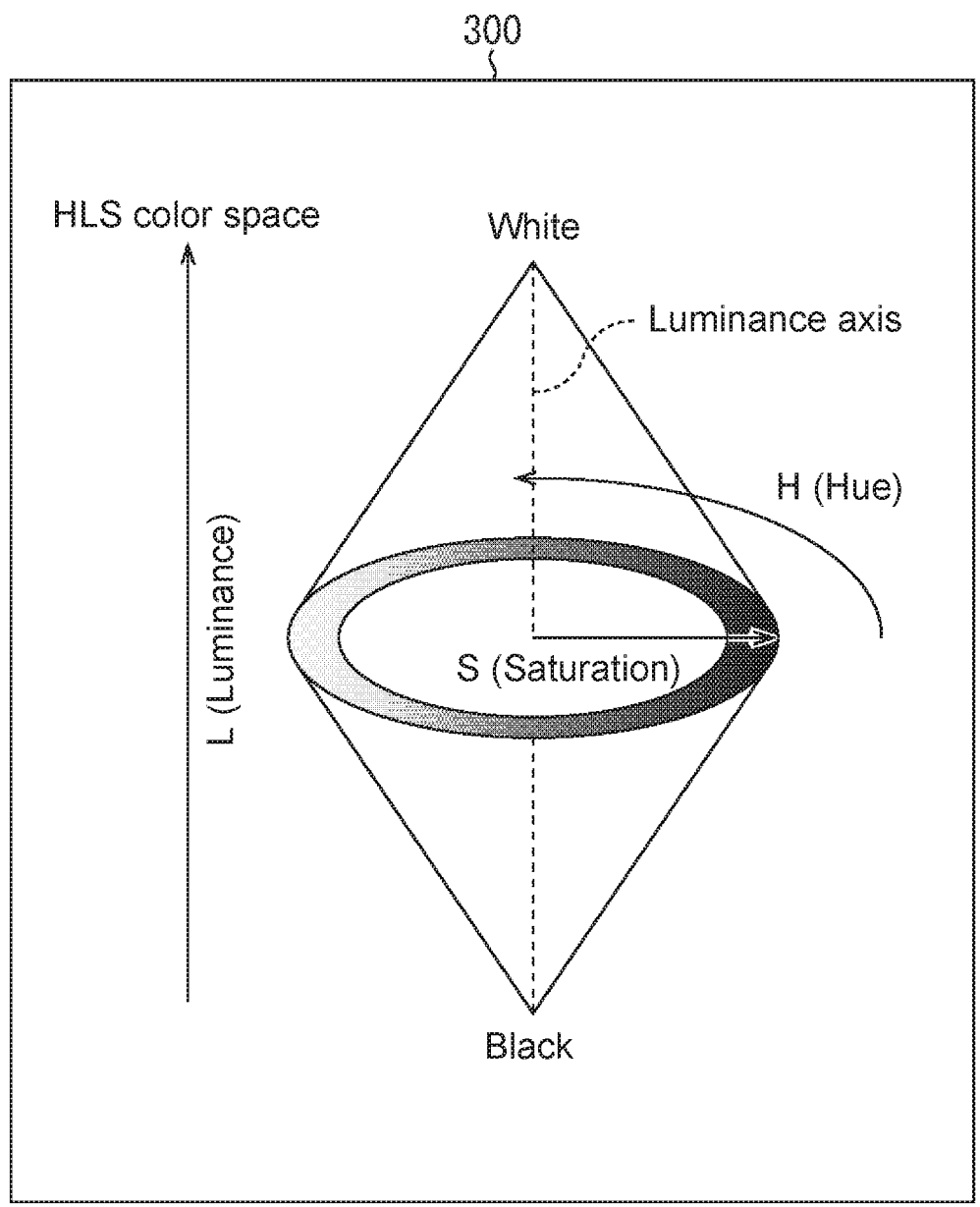
FIG. 31 is a diagram showing an HLS color space.

FIG. 31 is a diagram showing an HLS color space.

In an HLS color space 300, the vertical axis represents a luminance L, and a distance from the axis of the luminance L (hereinafter, also referred to as luminance axis) on a two-dimensional plane perpendicular to the luminance axis represents a saturation S. Further, the angle about the luminance axis represents a hue H. A point on the luminance axis represents an achromatic color.

Figure 32:
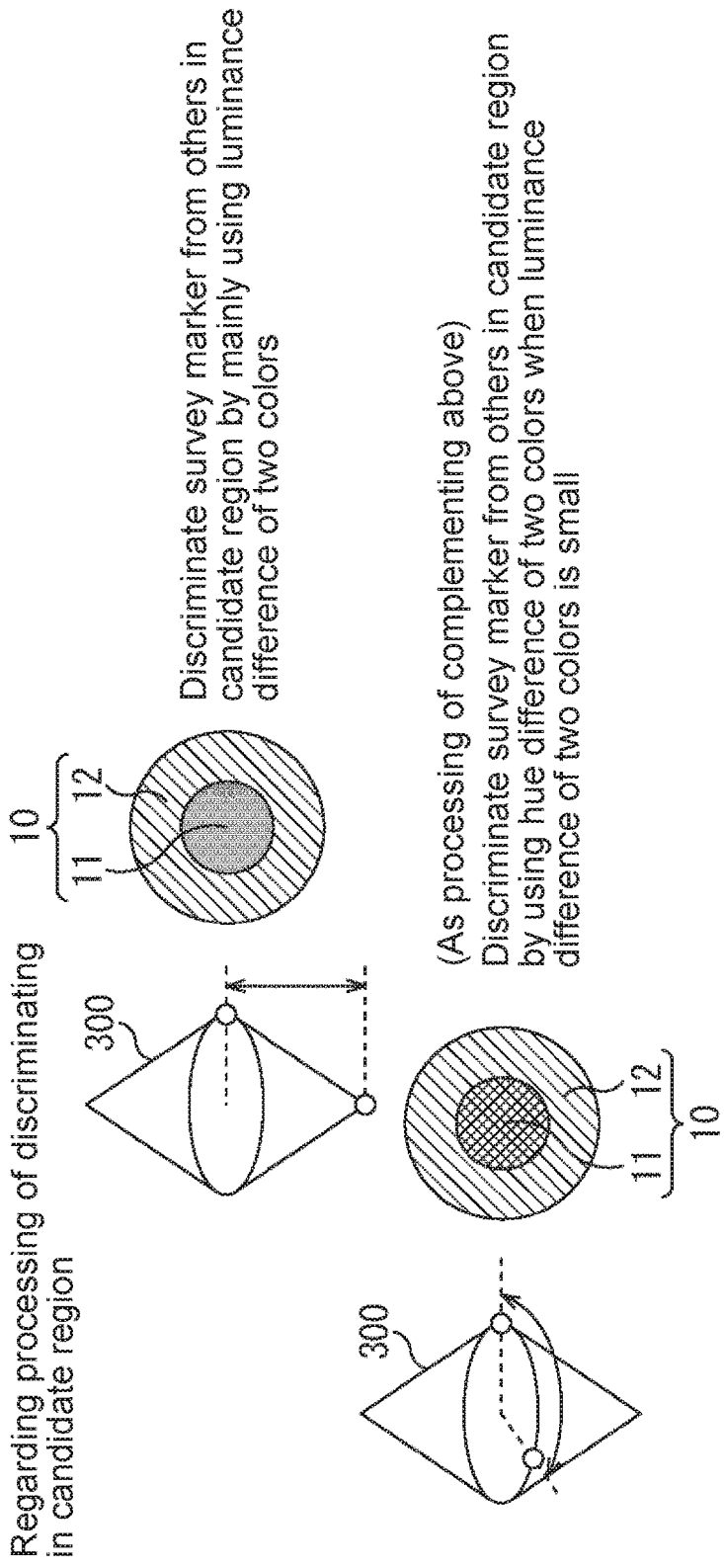
FIG. 32 is a diagram for describing the general outline of the detection of the survey marker 10 by using luminance.

FIG. 32 is a diagram for describing the general outline of the detection of the survey marker 10 by using the luminance.

The image processing apparatus of FIG. 10 can distinguish between the region of the survey marker 10 and other regions from the candidate region by using a distance between the luminances (luminance difference) of (regions assumed (estimated) as regions of) the respective circles 11 and 12 of the survey marker 10 appearing in the captured image.

For example, in a case where the circle 11 is in the black color and the circle 12 is in the red color, it is possible to relatively accurately distinguish between the region of the survey marker 10 and other regions from the candidate region by using the distance between the luminances of the respective circles 11 and 12.

Further, in a case where the distance between the luminances of the respective circles 11 and 12 is small, the image processing apparatus of FIG. 10 can distinguish between the region of the survey marker 10 and other regions from the candidate region by using a distance between the hues (hue difference) of the respective circles 11 and 12 of the survey marker 10 appearing in the captured image.

For example, in a case where the circle 11 has a chromatic color such as a blue color and the circle 12 has another chromatic color such as a red color, if the distance between the luminances of the respective circles 11 and 12 is small, the image processing apparatus can distinguish between the region of the survey marker 10 and other regions from the candidate region by using the distance between the hues of the respective circles 11 and 12.

The detection of the survey marker 10 by using the luminance can be performed by using the distance between the luminances of the respective circles 11 and 12 adjacent to each other, or alternatively, by using the distance between the luminances of the respective circles 12 and 13 adjacent to each other or the distance between the luminances of the respective circles 11 and 13 that are not adjacent to each other.

FIG. 33 is a diagram for describing the general outline of the detection of the survey marker 10 by using the luminance in a case where the survey marker 10 includes the circles 11 to 13.

Here, circles having the black color, the red color, and the black color can be employed as the circles 11 to 13, respectively.

In a case where the survey marker 10 includes the circles 11 to 13, the detection of the survey marker 10 can be performed by using a distance A between the luminances of the respective circles 11 and 12, a distance B between the luminances of the respective circles 11 and 13, and a distance C between the luminances of the respective circles 12 and 13.

Additionally, for example, in a case where one or both of the distances A and C among the distances A to C are small, the detection of the survey marker 10 can be performed by using a distance between the hues of the respective circles 11 and 12, a distance between the hues of the respective circles 11 and 13, and a distance between the hues of the respective circles 12 and 13.

Figure 34:
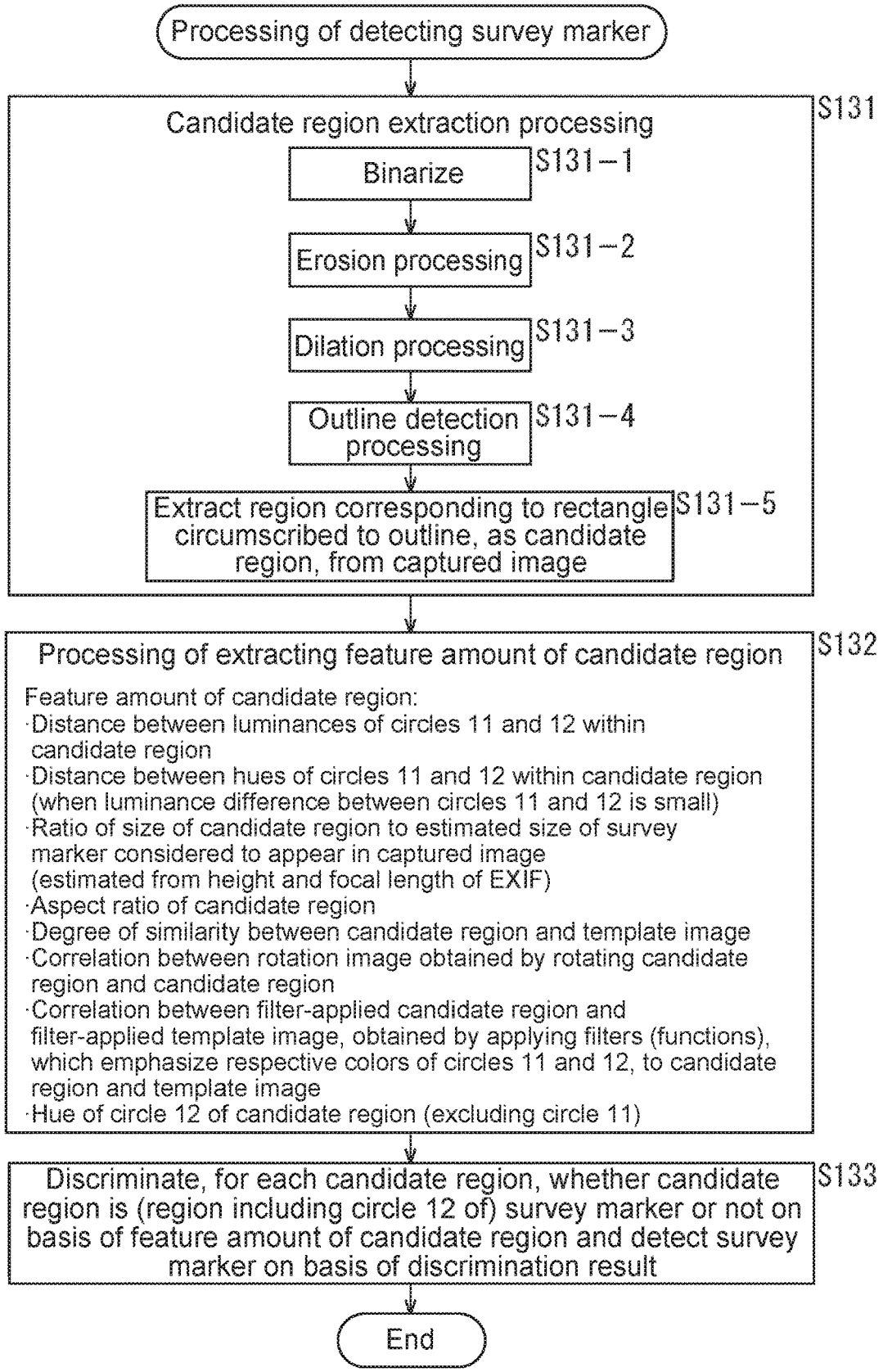
FIG. 34 is a flowchart for describing another example of the detection processing.

FIG. 34 is a flowchart for describing another example of the detection processing of detecting the survey marker 10, which is performed by the CPU 32 of the cloud server 30 as the image processing apparatus of FIG. 10.

In Step S131, the candidate region extraction unit 61 performs candidate region extraction processing of extracting the candidate region from the captured image obtained from the camera 21.

In the candidate region extraction processing, in Step S131-1, the candidate region extraction unit 61 binarizes (the pixel value of) each pixel of the captured image to 1 or 0 depending on whether the pixel is a pixel of the circle 12 of the survey marker 10 or not.

The binarizing in Step S131-1 can be performed by, for example, threshold processing for the luminance or hue of the pixel.

In the candidate region extraction processing, in Step S131-2, the candidate region extraction unit 61 performs erosion processing on a binarized image obtained by binarizing the captured image and controls the noise of the binarized image.

Furthermore, in the candidate region extraction processing, in Step S131-3, the candidate region extraction unit 61 performs dilation processing on the binarized image after the erosion processing.

After that, in the candidate region extraction processing, in Step S131-4, the candidate region extraction unit 61 performs outline detection processing of detecting the outline of the region of the pixels having the pixel values of, e.g., 1 in the binarized image obtained after the dilation processing, that is, the outline of the region of the pixels, in which it is assumed that the circle 12 appears, in the captured image.

In the candidate region extraction processing, in Step S131-5, the candidate region extraction unit 61 then extracts a region corresponding to a minimum rectangle circumscribed to the outline detected by the outline detection processing, as a candidate region, from the captured image, and supplies the region to the feature amount extraction unit 62.

In a case where there are a plurality of outlines detected by the outline detection processing, a candidate region is extracted for each of the plurality of outlines.

In Step S132, the feature amount extraction unit 62 performs feature amount extraction processing of extracting the feature amount of a candidate region for each of candidate regions obtained from the candidate region extraction unit 61 and supplies the feature amount of each candidate region, which is obtained by the feature amount extraction processing, to the discrimination unit 63.

In the feature amount extraction processing in Step S132, the feature amount extraction unit 62 calculates, for example, the distance between the luminances of the respective circles 11 and 12 in addition to the feature amount as in the case of Step S32 in FIG. 11.

In other words, in the feature amount extraction processing in Step S132, the feature amount extraction unit 62 calculates the distance between the luminances of the respective circles 11 and 12, instead of the distance between the hues of the respective circles 11 and 12. In a case where the distance between the luminances is small, the feature amount extraction unit 62 calculates the distance between the hues of the respective circles 11 and 12.

Here, for example, in a case where the distance between the luminances of respective FIGS. 11 and 12 is equal to or larger than a threshold of the distance between the luminances, which is similarly calculated for the threshold TH of Expression (3), the candidate region is more likely to be discriminated as the survey marker 10.

In Step S133, the discrimination unit 63 discriminates, for each candidate region, (the region showing) (the circle 12 of) the survey marker 10 appearing in the captured image, in the captured image on the basis of the feature amount of the candidate region from the feature amount extraction unit 62.

In other words, the discrimination unit 63 discriminates whether the candidate region includes the survey marker 10 or not on the basis of the feature amount of the candidate region, as in the case of Step S33 in FIG. 11.

Furthermore, in a case of discriminating that the candidate region includes the survey marker 10, the discrimination unit 63 detects the survey marker 10 from the captured image obtained from the camera 21 on the basis of a discrimination result and outputs a detection result.

Note that in Step S133, in a case where the distance between the respective circles 11 and 12 is large (equal to or larger than threshold), the discrimination unit 63 can discriminate whether the candidate region includes the survey marker 10 or not without using the distance between the hues of the respective circles 11 and 12.

Further, in Step S133, in a case where the distance between the luminances of the respective circles 11 and 12 is small (not large), the discrimination unit 63 can use the distance between the hues of the respective circles 11 and 12 in order to discriminate whether the candidate region includes the survey marker 10 or not.

As described above, when the feature amount of the candidate region includes the distance between the hues or luminances of the respective circles 11 and 12, the survey marker 10 can be detected more accurately.

Figure 35:
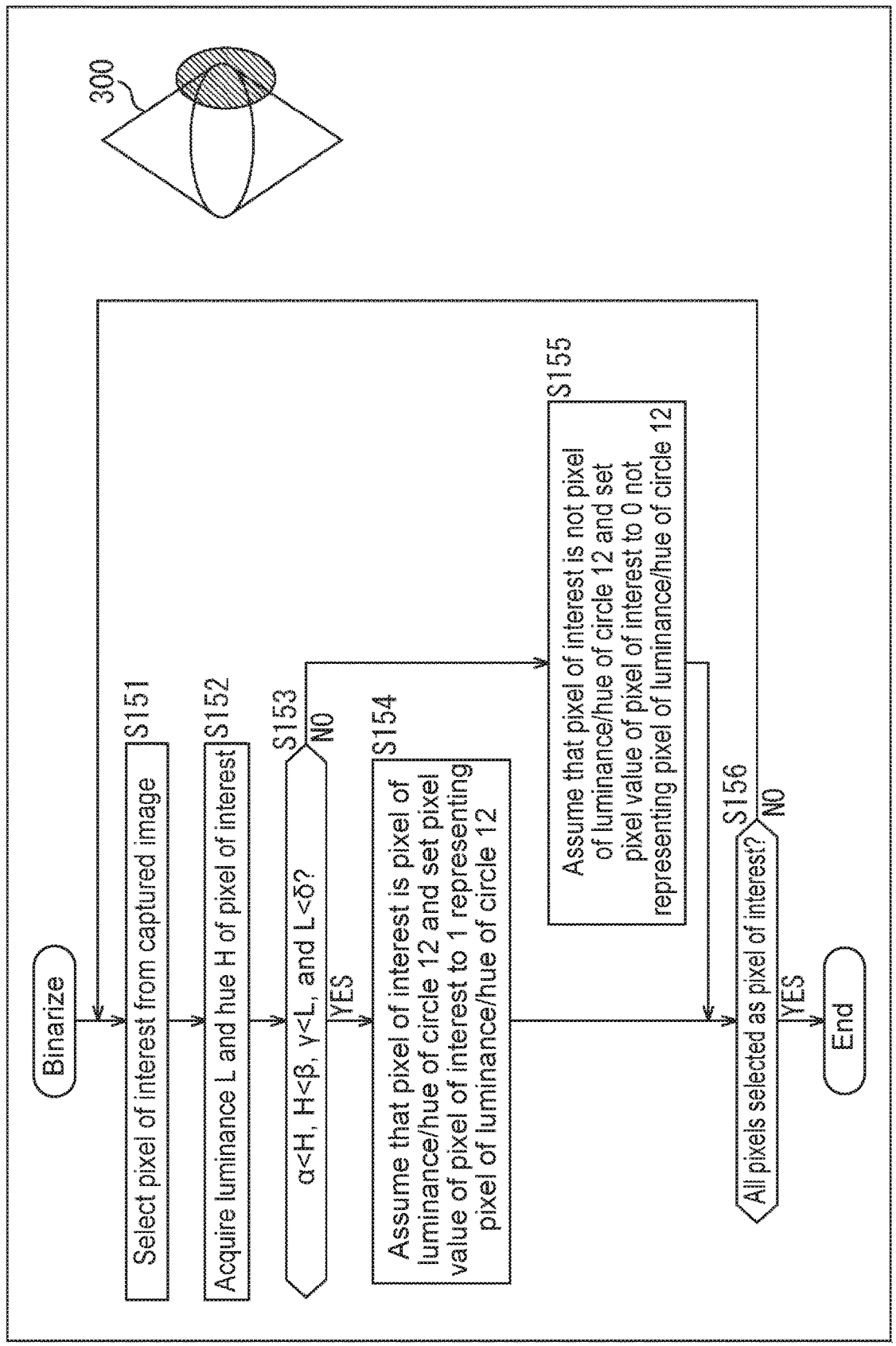
FIG. 35 is a flowchart for describing an example of detailed processing of binarizing each pixel of a captured image, which is performed in Step S131-1.

FIG. 35 is a flowchart for describing an example of detailed processing of binarizing each pixel of the captured image, which is performed in Step S131-1 of FIG. 34.

Note that, here, in order to facilitate discrimination from the colors in nature, a chromatic color having both of the luminance L and the hue H (e.g., red color) is used for the color of the circle 12 of the survey marker 10.

In Step S151, the candidate region extraction unit 61 selects one of the pixels of the captured image, which is not yet selected as a pixel of interest, as a pixel of interest, and the processing proceeds to Step S152.

In Step S152, the candidate region extraction unit 61 calculates and then acquires the luminance L and the hue H of the pixel of interest, and the processing proceeds to Step S153.

In Step S153, the candidate region extraction unit 61 determines whether the hue H of the pixel of interest is considered as the hue of the color of the circle 12 or not, that is, whether the hue H of the pixel of interest satisfies an expression of $\alpha<H$ and an expression of $H<\beta$ or not.

Here, $\alpha$ and $\beta$ represent the minimum value and the maximum value, respectively, in the range considered as the hue of the color of the circle 12, and are set in advance.

Furthermore, in Step S153, the candidate region extraction unit 61 determines whether the luminance L of the pixel of interest is considered as the luminance of the circle 12 or not, that is, whether the luminance L of the pixel of interest satisfies an expression of $\gamma<H$ and an expression of $H<\delta$ or not.

Here, $\gamma$ and $\delta$ represent the minimum value and the maximum value, respectively, in the range considered as the luminance of the circle 12, and are set in advance.

In Step S153, in a case where the hue H of the pixel of interest satisfies the expression of $\alpha<H$ and the expression of $H<\beta$, and the luminance L of the pixel of interest satisfies the expression of $\gamma<H$ and the expression of $H<\delta$, the processing proceeds to Step S154.

In Step S154, the candidate region extraction unit 61 assumes that the pixel of interest is the pixel of the luminance and hue of the circle 12 and sets the pixel value of the pixel of interest to 1 representing the pixel of the luminance and hue of the circle 12. The processing proceeds to Step S156.

Further, in Step S153, in a case where it is determined that the hue H of the pixel of interest does not satisfy at least one of the expression of $\alpha<H$ or the expression of $H<\beta$, or that the luminance L of the pixel of interest does not satisfy at least one of the expression of $\gamma<H$ or the expression of $H<\delta$, the processing proceeds to Step S155.

In Step S155, the candidate region extraction unit 61 assumes that the pixel of interest is not the pixel of the luminance and hue of the circle 12 and sets the pixel value of the pixel of interest to 0 not representing the pixel of the luminance and hue of the circle 12. The processing proceeds to Step S156.

In Step S156, the candidate region extraction unit 61 determines whether all the pixels of the captured image are selected as the pixel of interest or not.

In Step S156, when it is determined that all the pixels of the captured image are not yet selected as the pixel of interest, the processing returns to Step S151. In Step S151, the candidate region extraction unit 61 newly selects one of the pixels of the captured image, which is not yet selected as the pixel of interest, as the pixel of interest, and similar processing is repeated thereafter.

Further, in Step S156, when it is determined that all the pixels of the captured image are each selected as the pixel of interest, the binarizing processing is terminated.

Figure 36:
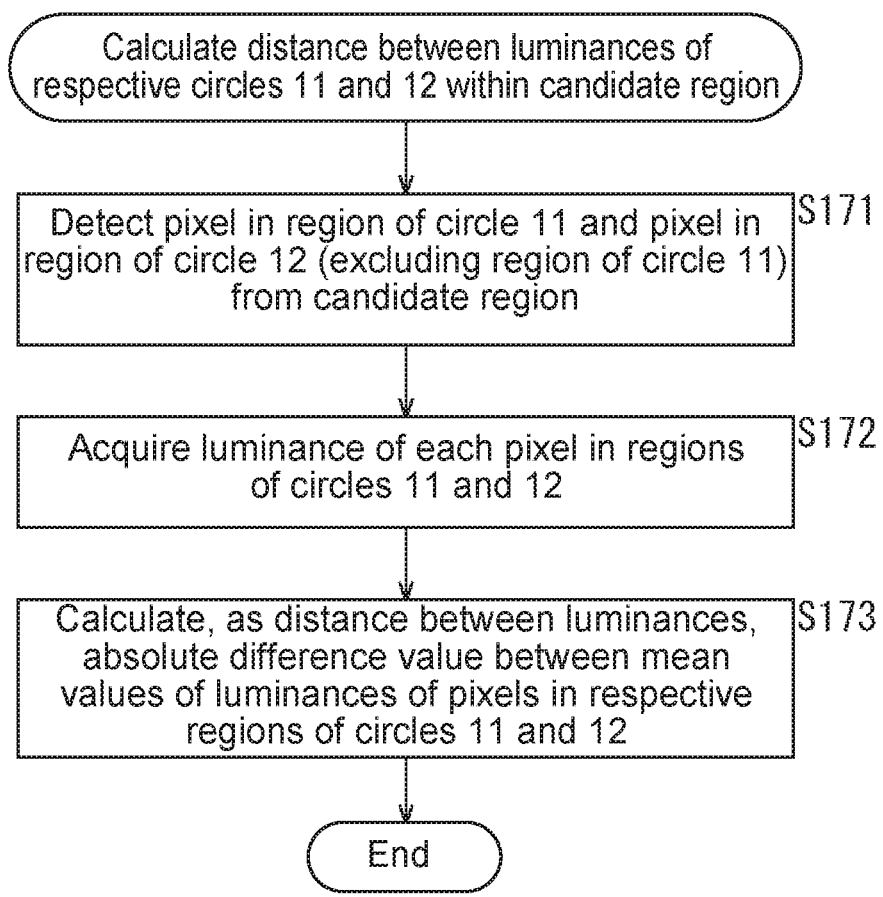
FIG. 36 is a flowchart for describing an example of processing of extracting a distance between the luminances of the respective circles 11 and 12 as a feature amount in feature amount extraction processing performed in Step S132.

FIG. 36 is a flowchart for describing an example of the processing of extracting the distance between the luminances of the respective circles 11 and 12 as a feature amount in the feature amount extraction processing performed in Step S132 of FIG. 34.

In Step S171, the feature amount extraction unit 62 assumes that the candidate region is a region circumscribed to the circle 12, and detects the pixels showing (supposed to show) the respective circles 11 and 12 existing in the candidate region (pixel in the region of the circle 11 and pixel in the region of the circle 12). The processing proceeds to Step S172.

In Step S172, the feature amount extraction unit 62 calculates and acquires the luminance of each pixel in the region of the circle 11 and also calculates and acquires the luminance of each pixel in the region of the circle 12. The processing proceeds to Step S173.

In Step S173, the feature amount extraction unit 62 calculates, as the distance between the luminances of the respective the circles 11 and 12, an absolute difference value between a mean value of the luminances of the respective pixels in the region of the circle 11 and a mean value of the luminances of the respective pixels in the region of the circle 12. The processing is then terminated.

As described above, the detection of the survey marker 10 from the captured image can be performed by using one or both of the distances between the luminances and hues of the adjacent circles of the survey marker 10.

Here, in this specification, the processing performed by the computer such as the cloud server 30 according to a program is not necessarily performed in chronological order along the order described in the flowchart. In other words, the processing performed by the computer according to a program also includes processing executed in parallel or individually (e.g., parallel processing or processing by object).

Further, the program may be processed by a single computer (processor) or may be distributed and processed by a plurality of computers. Furthermore, the program may be transferred to a remote computer to be executed.

Furthermore, in this specification, a system means an aggregation of a plurality of constituent elements (apparatus, module (parts), and the like), regardless of whether all constituent elements are included in the same casing or not. Therefore, a plurality of apparatuses accommodated in separate casings and connected to one another via a network is a system, and one apparatus including a plurality of modules in one casing is also a system.

Note that the embodiments of the present disclosure are not limited to the embodiments described above and can be variously modified without departing from the gist of the present disclosure.

In other words, in this embodiment, the case where the present technology is applied to the soil-volume measurement system has been described, but the present technology can be applied to a system other than the soil-volume measurement system, for example, a system that performs arbitrary measurement for building or others by using aerial image capturing of survey markers.

Furthermore, the present technology can have a configuration of cloud computing in which a plurality of apparatuses share one function and cooperate to perform processing via a network.

Further, the steps described in the flowchart described above can be executed by one apparatus or shared and executed by a plurality of apparatuses.

Furthermore, in the case where one step includes a plurality of processing steps, the plurality of processing steps in one step can be executed by one apparatus or shared and executed by a plurality of apparatuses.

Further, the effects disclosed herein are merely exemplary ones and are not restrictive ones, and any other effects may be produced.

Note that the present technology can have the following configurations.

<1> An image processing apparatus, including:
a candidate region extraction unit that extracts a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue;
a feature amount extraction unit that extracts a feature amount of the candidate region; and
a discrimination unit that discriminates the survey marker on the basis of the feature amount.

<2> The image processing apparatus according to <1>, in which
the candidate region extraction unit extracts the candidate region by using at least the hue among the hue, a saturation, and a lightness of a circle having a second smallest radius among the plurality of circles.

<3> The image processing apparatus according to <1> or <2>, in which
the feature amount extraction unit extracts, as the feature amount, a distance between the luminance or hue of a circle having a smallest radius and the luminance or hue of a circle having a second smallest radius among the plurality of circles.

<4> The image processing apparatus according to any one of <1> to <3>, in which the feature amount extraction unit extracts, as the feature amount, a correlation between the candidate region and a rotation image obtained by rotating the candidate region by a predetermined angle other than an integer multiple of $2\pi$.

<5> The image processing apparatus according to any one of <1> to <4>, in which
the feature amount extraction unit
applies a filter, which emphasizes a color provided to the circle, to the candidate region and a template image of the survey marker, and
extracts, as the feature amount, a correlation between the candidate region and the template image after the filter is applied.

<6> The image processing apparatus according to any one of <1> to <5>, in which
the survey marker includes a built-in detection apparatus that acquires information regarding the survey marker, and
the candidate region extraction unit extracts the candidate region by using the information regarding the survey marker, the information being detected by the detection apparatus.

<7> The image processing apparatus according to any one of <1> to <6>, in which
the survey marker includes a built-in illuminance detection apparatus that detects illuminance,
the feature amount extraction unit extracts, as the feature amount, a distance between the luminance or hue of a circle having a smallest radius and the luminance or hue of a circle having a second smallest radius, among the plurality of circles, and the discrimination unit
compares the distance with a predetermined threshold, and
sets, on the basis of a comparison result, the predetermined threshold to be used for discriminating whether the candidate region includes the survey marker or not, by using the illuminance of the survey marker, the illuminance being detected by the illuminance detection apparatus.

<8> The image processing apparatus according to any one of <1> to <7>, in which
a discrimination result of the survey marker is used to create a three-dimensional model.

<9> The image processing apparatus according to <8>, in which
the three-dimensional model is used to perform soil-volume measurement.

<10> An image processing method, including:
extracting a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue;
extracting a feature amount of the candidate region; and
discriminating the survey marker on the basis of the feature amount.

<11> A program for causing a computer to function as:
a candidate region extraction unit that extracts a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue;
a feature amount extraction unit that extracts a feature amount of the candidate region; and
a discrimination unit that discriminates the survey marker on the basis of the feature amount.

<12> A survey marker, having a planar shape and including a plurality of circles concentrically disposed and each having a different radius, the plurality of circles including adjacent circles each having a different luminance or hue.

<13> The survey marker according to <12>, in which the survey marker includes two circles as the plurality of circles.

<14> The survey marker according to <12>, in which the survey marker includes three circles as the plurality of circles.

<15> The survey marker according to any one of <12> to <14>, in which
colors of two adjacent circles among the plurality of circles are two predetermined colors in which a distance between luminances or hues of the two respective regions obtained from a captured image has a predetermined threshold or more, the captured image being obtained by image capturing of a marker including two adjacent regions having the colors of the two circles.

<16> The survey marker according to <15>, in which
the colors of a circle having a smallest radius and a circle having a second smallest radius among the plurality of circles are the two predetermined colors.

<17> The survey marker according to <16>, in which
a portion of the circle having the second smallest radius, the portion being obtained by removing the circle having the smallest radius from the circle having the second smallest radius, has an area substantially 1.0 to 3.0 times an area of the circle having the smallest radius.

<18> The survey marker according to any one of <12> to <17>, in which
the survey marker has a planar shape and includes a plurality of circles concentrically disposed, and a rectangle including the plurality of circles is disposed.

<19> The survey marker according to any one of <12> to <18>, in which
the survey marker includes a built-in illuminance detection apparatus that detects illuminance, in a portion of a circle having a smallest radius among the plurality of circles.

REFERENCE SIGNS LIST 10 survey marker
11 circle (columnar member)
12, 13 circle (circular member)
14 frame region
20 drone
21 camera
30 cloud server
31 bus
32 CPU
33 ROM
34 RAM
35 hard disk
36 output unit
37 input unit
38 communication unit
39 drive
40 input/output interface
41 removable recording medium
61 candidate region extraction unit
62 feature amount extraction unit
63 discrimination unit
111 communication unit
112 control unit
113 drive control unit
114 flight mechanism
121 flight control apparatus
201 to 203, 213, 223, 231, 250 member
300 HLS color space

The invention claimed is:

1. An image processing apparatus, comprising:
circuitry configured to:
extract a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue;
extract a feature amount of the candidate region;
discriminate the survey marker on a basis of the feature amount; and
extract, as the feature amount, a distance between the luminance or hue of one circle of the plurality of circles and the luminance or hue of another circle of the plurality of circles,
wherein the one circle has a smallest radius and the another circle has a second smallest radius among the plurality of circles.

2. The image processing apparatus according to claim 1, wherein
the circuitry is further configured to extract the candidate region by using at least the hue among the hue, a saturation, and a lightness of a circle having a second smallest radius among the plurality of circles.

3. The image processing apparatus according to claim 1, wherein
the circuitry is further configured to extract, as the feature amount, a correlation between the candidate region and a rotation image obtained by rotating the candidate region by a predetermined angle other than an integer multiple of $2\pi$.

4. The image processing apparatus according to claim 1, wherein
the circuitry is further configured to:
apply a filter, which emphasizes a color provided to the plurality of circles, to the candidate region and a template image of the survey marker; and
extract, as the feature amount, a correlation between the candidate region and the template image after the filter is applied.

5. The image processing apparatus according to claim 1, wherein
the survey marker acquires information regarding the survey marker, and
the circuitry is further configured to extract the candidate region by using the information regarding the survey marker.

6. The image processing apparatus according to claim 1, wherein
the survey marker detects illuminance of the survey marker,
the circuitry is further configured to:
extract, as the feature amount, a distance between the luminance or hue of a circle having a smallest radius and the luminance or hue of a circle having a second smallest radius, among the plurality of circles;
compare the distance with a predetermined threshold; and
set, on a basis of a comparison result, the predetermined threshold to be used for discriminating whether the candidate region includes the survey marker or not, by using the illuminance of the survey marker.

7. The image processing apparatus according to claim 1, wherein
the circuitry is further configured to create a three-dimensional model based on a discrimination result of the survey marker.

8. The image processing apparatus according to claim 7, wherein
the circuitry is further configured to perform soil-volume measurement based on the three-dimensional model.

9. An image processing method, comprising:
extracting a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue;
extracting a feature amount of the candidate region;
discriminating the survey marker on a basis of the feature amount; and
extracting, as the feature amount, a distance between the luminance or hue of one circle of the plurality of circles and the luminance or hue of another circle of the plurality of circles,
wherein the one circle has a smallest radius and the another circle has a second smallest radius among the plurality of circles.

10. A non-transitory computer-readable medium having embodied thereon a program, which when executed by a computer causes the computer to execute an information processing method, the method comprising:
extracting a candidate region from a captured image obtained by image capturing of a survey marker, the candidate region being a candidate of a region in which the survey marker appears, the survey marker having a planar shape and including a plurality of circles concentrically disposed, the plurality of circles including adjacent circles each having a different luminance or hue;
extracting a feature amount of the candidate region;
discriminating the survey marker on a basis of the feature amount; and
extracting, as the feature amount, a distance between the luminance or hue of one circle of the plurality of circles and the luminance or hue of another circle of the plurality of circles,
wherein the one circle has a smallest radius and the another circle has a second smallest radius among the plurality of circles.

11. A survey marker, having a planar shape and including a plurality of circles concentrically disposed and each having a different radius, the plurality of circles including adjacent circles each having a different luminance or hue,
wherein the survey marker includes a built-in illuminance detection apparatus that detects illuminance, in a portion of a circle having a smallest radius among the plurality of circles.

12. The survey marker according to claim 11, wherein
the survey marker includes two circles as the plurality of circles.

13. The survey marker according to claim 11, wherein
the survey marker includes three circles as the plurality of circles.

14. The survey marker according to claim 11, wherein
colors of two adjacent circles among the plurality of circles are two predetermined colors in which a distance between luminances or hues of two respective regions obtained from a captured image has a predetermined threshold or more, the captured image being obtained by image capturing of a marker including two adjacent regions having the colors of the two circles.

15. The survey marker according to claim 14, wherein
the colors of a circle having a smallest radius and a circle having a second smallest radius among the plurality of circles are the two predetermined colors.

16. The survey marker according to claim 15, wherein
a portion of the circle having the second smallest radius, the portion being obtained by removing the circle having the smallest radius from the circle having the second smallest radius, has an area substantially 1.0 to 3.0 times an area of the circle having the smallest radius.

17. The survey marker according to claim 11, wherein
the survey marker has a planar shape and includes a plurality of circles concentrically disposed, and a rectangle including the plurality of circles is disposed.

* * * * *